United States Patent
Odryna et al.

(10) Patent No.: US 6,333,750 B1
(45) Date of Patent: Dec. 25, 2001

(54) MULTI-SOURCED VIDEO DISTRIBUTION HUB

(75) Inventors: Victor Odryna, Acton; Robert L. Gilgen, Westford; Mark A. Desmarais, Northborough, all of MA (US)

(73) Assignee: Cybex Computer Products Corporation, Huntsville, AL (US)

( * ) Notice: Subject to any disclaimer, the term of this patent is extended or adjusted under 35 U.S.C. 154(b) by 0 days.

(21) Appl. No.: 09/100,582

(22) Filed: Jun. 19, 1998

Related U.S. Application Data

(63) Continuation-in-part of application No. 08/909,924, filed on Aug. 12, 1997, now Pat. No. 6,104,414.
(60) Provisional application No. 60/040,730, filed on Mar. 12, 1997.

(51) Int. Cl.[7] .................................................... G09G 5/00
(52) U.S. Cl. ........................ 345/629; 345/1.1; 345/3.1; 345/213; 345/545; 345/543; 345/536; 348/14.07; 348/14.04; 348/584; 348/716; 725/82; 725/109; 725/114; 725/119; 725/117; 725/98
(58) Field of Search .................. 345/113–115, 507–508, 345/1–2, 3, 211–213, 327–328, 435, 501, 502; 348/584–586, 589–590, 598, 6, 8, 15–17, 12–13; 709/217–219

(56) References Cited

U.S. PATENT DOCUMENTS

| | | | |
|---|---|---|---|
| Re. 33,916 | 5/1992 | Saenz et al. .......................... | 340/703 |
| 3,743,773 | 7/1973 | Sobel ..................................... | 178/7.3 |
| 3,765,011 | 10/1973 | Sawyer et al. ........................ | 340/324 |
| 3,786,479 | 1/1974 | Brown et al. .......................... | 340/324 |
| 4,635,105 | 1/1987 | Favreau .................................. | 358/67 |
| 4,727,362 | 2/1988 | Rackley et al. ........................ | 340/703 |
| 4,760,388 | 7/1988 | Tatsumi et al. ....................... | 340/717 |
| 4,823,286 | 4/1989 | Lumelsky et al. .................... | 364/521 |
| 4,947,244 | 8/1990 | Fenwick et al. ....................... | 358/86 |
| 5,105,183 | 4/1992 | Beckman .............................. | 340/717 |
| 5,113,180 | 5/1992 | Gupta et al. .......................... | 340/747 |
| 5,179,642 | 1/1993 | Komatsu ............................... | 345/435 |
| 5,218,432 | * 6/1993 | Wakeland ............................. | 348/590 |
| 5,218,775 | 6/1993 | Singer ................................... | 40/617 |
| 5,261,735 | 11/1993 | Cohen et al. .......................... | 312/282 |
| 5,276,458 | 1/1994 | Sawdon ................................. | 345/132 |
| 5,313,592 | 5/1994 | Buondonno et al. ................. | 395/325 |
| 5,335,081 | 8/1994 | Yamaguchi et al. .................. | 358/342 |
| 5,374,940 | 12/1994 | Corio ...................................... | 345/1 |
| 5,396,257 | 3/1995 | Someya et al. ........................ | 345/1 |
| 5,403,457 | 4/1995 | Nago et al. ........................... | 204/192.2 |
| 5,404,452 | 4/1995 | Detschel et al. ...................... | 395/250 |
| 5,418,962 | 5/1995 | Bodin et al. ........................... | 395/700 |
| 5,448,291 | 9/1995 | Wickline ............................... | 348/159 |
| 5,448,307 | 9/1995 | Gelissen et al. ....................... | 348/584 |

(List continued on next page.)

Primary Examiner—Richard Hjerpe
Assistant Examiner—Francis Nguyen
(74) Attorney, Agent, or Firm—Nixon & Vanderhye PC

(57) ABSTRACT

A video graphics system wherein a large quantity of video data is independently and selectively made available to plural video display devices. The large quantity of video data can be contributed to by plural sources of video data of differing formats. Further, the display devices can also be of varying types, each requiring a different input data format. A multi-sourced video distribution element, also referred to as a hub, serves as an interface between one or more sources of video display data and one or more video display devices. One source of data can be identified as a base image, and other sources of data can be utilized for overlay images integrated into the base image. The base image and any integrated overlay images are provided on a pixel bus internal to the hub. The hub can then be configured as an interface to one or more types of video display devices and/or to another hub. A desired portion of the base image and/or an integrated overlay image(s), if any, is then provided for display on the video display device(s) and/or to the interconnected hub.

101 Claims, 18 Drawing Sheets

U.S. PATENT DOCUMENTS

| | | | |
|---|---|---|---|
| 5,488,385 | 1/1996 | Singhal et al. | 345/3 |
| 5,502,808 | 3/1996 | Goddard et al. | 395/162 |
| 5,513,365 | 4/1996 | Cook et al. | 395/800 |
| 5,523,769 | 6/1996 | Lauer et al. | 345/1 |
| 5,532,719 | 7/1996 | Kikinis | 345/211 |
| 5,539,465 | 7/1996 | Xu et al. | 348/388 |
| 5,731,799 | 3/1998 | Kee et al. | 345/634 |
| 5,872,565 * | 2/1999 | Greaves et al. | 345/328 |
| 5,892,521 * | 4/1999 | Blossom et al. | 345/501 |
| 6,104,414 * | 8/2000 | Odryna et al. | 345/536 |

* cited by examiner

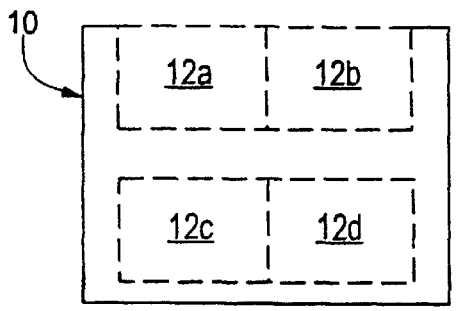 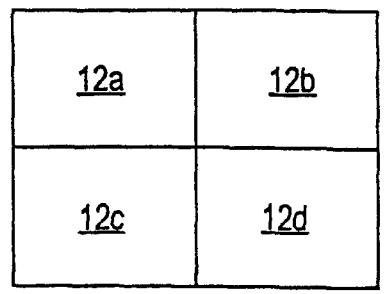
FIG. 1A
(Prior Art)
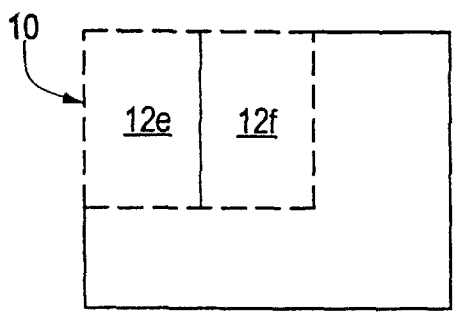 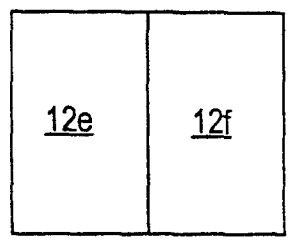
FIG. 1B
(Prior Art)
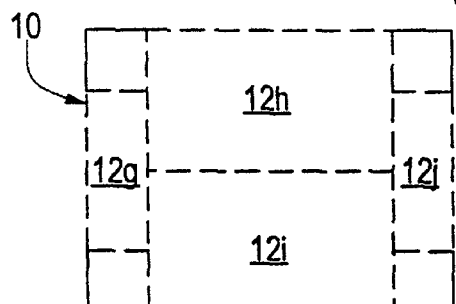 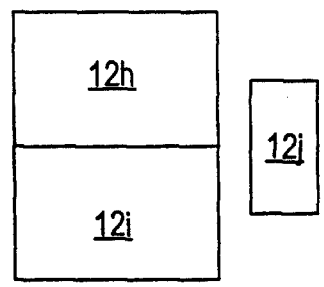
FIG. 1C
(Prior Art)
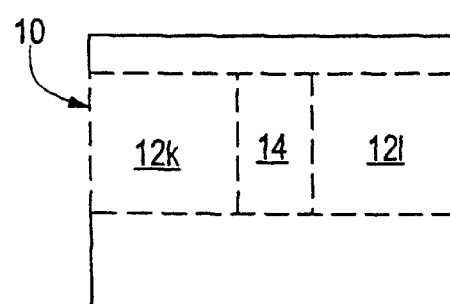 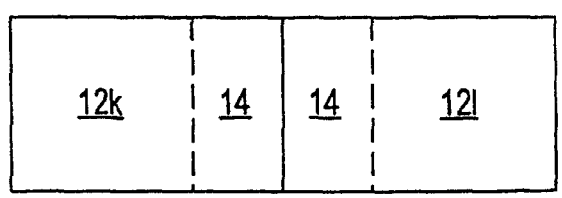
FIG. 1D
(Prior Art)

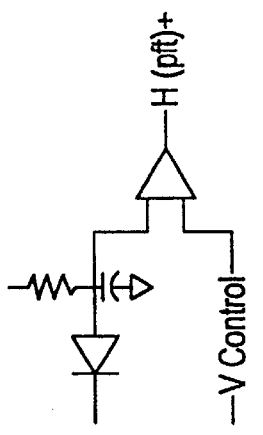
FIG. 14
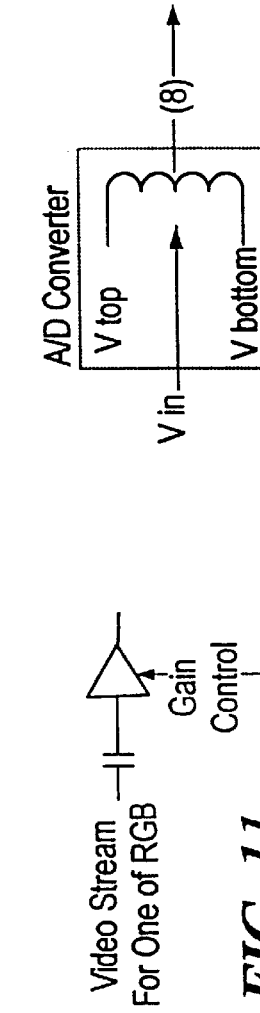
FIG. 13
FIG. 11
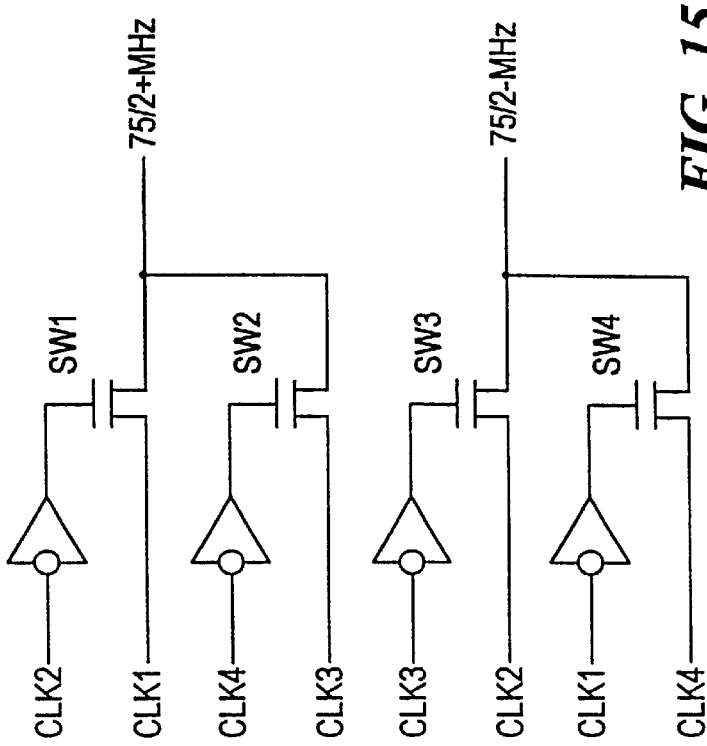
FIG. 15
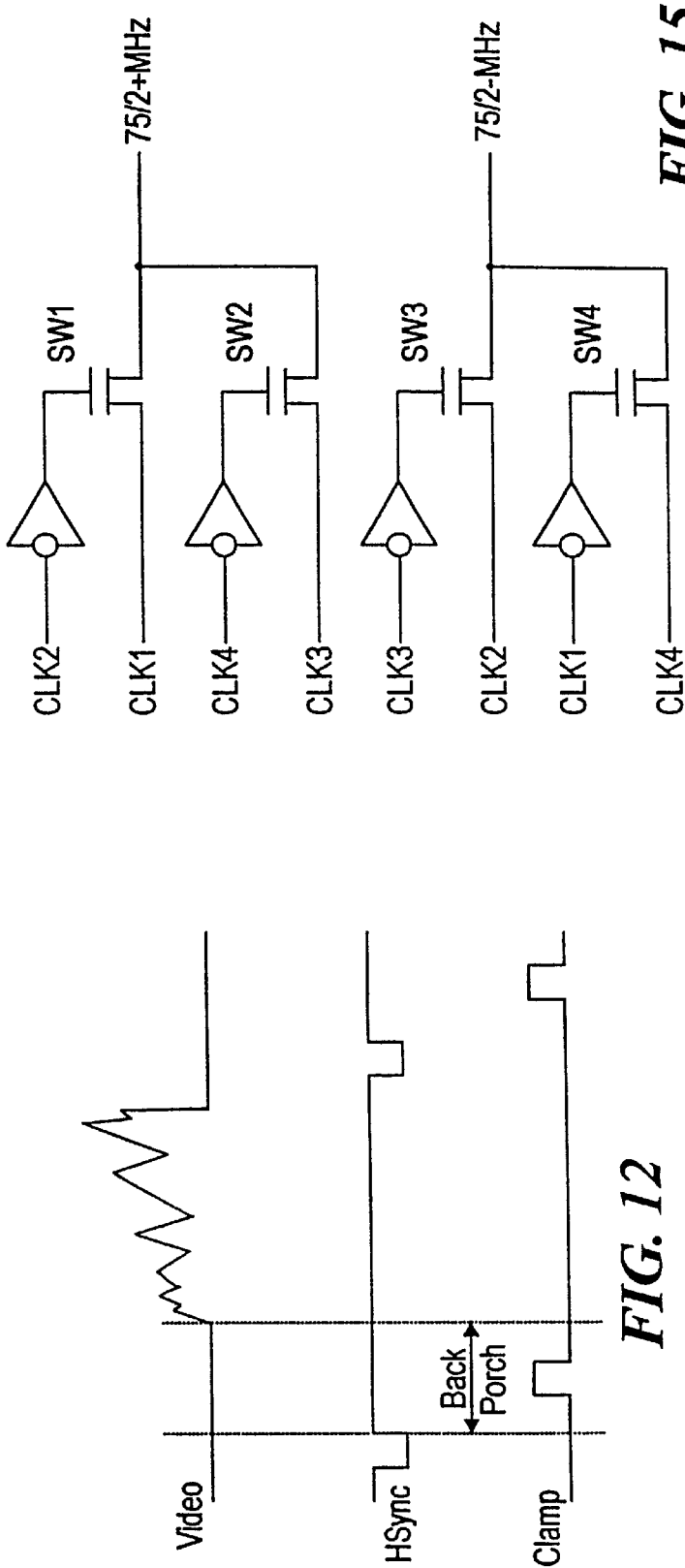
FIG. 12

MULTI-SOURCED VIDEO DISTRIBUTION HUB

CROSS REFERENCE TO RELATED APPLICATIONS

This application is a continuation-in-part of U.S. patent application Ser. No. 08/909,924, filed Aug. 12, 1997 now U.S. Pat. No. 6,104,414 which claims priority of U.S. Provisional Patent Application No. 60/040,730, filed Mar. 12, 1997.

STATEMENT REGARDING FEDERALLY SPONSORED RESEARCH OR DEVELOPMENT

Not Applicable

BACKGROUND OF THE INVENTION

Modern trading floors seek to maximize their productivity by increasing utilization of floor space. This means that floor designers must squeeze as many traders as possible onto the floor, while providing these traders with large amounts of visual data. This data comes in the form of computer-generated text and graphical data, video feeds, and analog text feeds. While the increasing need for data drives up the number and size of these data displays, a clear line-of-sight between traders is often needed to facilitate communications between them.

The historical technology of choice for displaying the data on trading floors has been the CRT. As information needs have grown, so has the size of the CRT necessary to display that data. At the present time, CRT displays with a twenty-one inch diagonal (nineteen inches usable diagonal) is the largest display commonly used, while the seventeen inch CRT (fifteen inches usable diagonal) is the most prevalent display. Multiple monitors are frequently connected to a single host computer to allow large amounts of data be displayed, while requiring only one set of user interaction devices (such as keyboard and mouse) and a single computer.

Recently, flat panel monitors have begun to make inroads into the desktop trading market. Primarily based on Liquid Crystal Displays (LCDs), these monitors typically consume 70% less power, have smaller bezels, and are only three to six inches in depth. Because of their relatively small size, these displays allow trading desks to be made much smaller, and they can be mounted in ways which are difficult and costly with CRTs. Unfortunately, LCD monitors are still quite expensive.

As mentioned earlier, multi-head displays are quite common in the desktop trading market. Typically, multiple graphics cards are inserted into the host PC, each driving one monitor. Alternatively, specialized multi-head graphics cards are available which can drive two or four heads simultaneously. Both of these methods have substantial drawbacks. The first suffers in that the limited number of computer bus slots (usually only three PCI-style) available in a typical PC are squandered by the graphics cards. The limited number of bus slots means that only three heads may be connected to a single PC using this method. The second method suffers because the specialized multi-head graphics cards are quite expensive, and tend to lack features present in leading-edge single-head cards. One such multi-head card actually provides on a single card the circuitry normally found on two graphics card in order to drive two displays.

In addition to the need to selectively and independently provide a large quantity of video data on several video display terminals, it is desirable to merge plural video data sources of varying formats into a single video data stream, and to make that integrated data stream selectively and independently available to a variety of video display devices, including devices having varying requirements for input video data format.

BRIEF SUMMARY OF THE INVENTION

The present invention enables the provision of a multi-head virtual monitor from the perspective of a host computer via the use of one or more video distribution hubs. Each hub receives a video signal from a standard graphics card in a PC and generates output signals appropriate for driving a plurality of video displays such as flat panel or Cathode Ray Tube (CRT) video displays. The video displays may be oriented either horizontally, in landscape mode, or vertically, in portrait mode, or in a combination of landscape and portrait arrangements. Additionally, a single hub can drive displays of differing resolutions as well as head orientations. The hub, in combination with host software, can be automatically reconfigured when a display is swapped out to accommodate the newly substituted display. In a preferred embodiment, the hub is particularly adapted for driving a plurality of flat panel displays such as active matrix flat panel displays, dual scan passive flat panel displays, or a combination of such displays.

More particularly, in a preferred embodiment, a video graphics system in accordance with the present invention includes a video graphics adapter having a host interface for coupling the video graphics adapter to a host computer such as a personal computer, workstation, microcomputer, minicomputer, mainframe or the like, and an output for driving a video data signal, such as an RGB analog video signal. The video graphics adapter includes an "oversize" display buffer which has a buffer capacity greater than that necessary to drive a single video display. The video graphics system further includes a video distribution hub which has a video input interface for receiving a video signal, such as the RGB analog video signal from the video graphics adapter, and a plurality of output ports for driving associated displays.

The video distribution hub receives the video signal from the video graphics adapter at the video input interface of the video distribution hub and, in the case where the received signal is an analog signal, applies the signal to an analog to digital converter (ADC) to generate digital signals corresponding to red, green and blue data signals. The digital video is applied to a bus which feeds a plurality of frame buffer logic sections within the video distribution hub. Each frame buffer logic portion within the video distribution hub includes a frame buffer which is employed to drive a display coupled to an output of the respective frame buffer logic portion.

In an alternative embodiment of the present invention, the hub is configured to accept a digital input prior to selectively storing data in associated frame buffers. A further alternative embodiment of the present invention provides an analog output suitable, for instance, for driving conventional CRTs.

A further aspect of the presently disclosed invention is based upon the foregoing video graphics system wherein a large quantity of video data is independently and selectively made available to plural video display devices. Here, however, the large quantity of video data can be contributed to by plural sources of video data of differing formats. Further, the display devices can also be of varying types, each requiring a different input data format.

A multi-sourced video distribution element, also referred to as a hub, serves as an interface between one or more sources of video display data and one or more video display devices. The video display data can be provided in a variety of formats. One source of data can be identified as a base image, and other sources of data can be utilized for overlay images integrated into the base image. The base image and any integrated overlay images are provided on a pixel bus internal to the hub. The hub can then be configured as an interface to one or more of various types of video display devices, and/or to another hub. A desired portion of the base image or the entire base image, and/or an integrated overlay image(s), if any, is then provided for display on the video display device(s) and/or to the interconnected hub.

Video data input to the hub can be either digital or analog. Digital input can be via a standard PANELLINK™ electrical interface such as the DFP standard defined by the Digital Flat Panel Initiative, via some derivative of that standard, via a custom PANELLINK™ format, or via the VESA-standard plug-in display format. Further, digital input can be presented as a digitized version of the output of a standard graphics adapter board commonly found in personal computers, which normally provides an RGB, or red, green, blue analog signal, along with one of various synchronization signal formats. Buffered digital video data can also be provided as an input, for instance from another hub. Additionally, the digital input can be a serialized digital input which provides graphics commands for the generation of an image, as opposed to the provision of the digital image data itself. Analog inputs to the hub can include a variety of video input formats, such as RGB, NTSC, PAL, SECAM, or other broadcast, or baseband composite, video (BVIDEO) format. A significant capability provided by the hub lies in the ability to provide an interface for a wide variety of digital or analog inputs, whether presently known or identified in the future, as required by the particular application. For instance, while the presently disclosed hub interfaces primarily to wireline sources of input data in one embodiment, other embodiments provide an interface to fiber optic data paths or to RF sources of data.

In a first embodiment of the present invention, the hub is configured as a chassis having a backplane and plural slots for various integrated circuit interface boards. The backplane supports plural communications and control signal paths interconnecting the slots, and also provides a power module for receiving source voltage and for dividing the same into other voltages as required by the interface boards. In one embodiment, the power module is in communication with an external source of 12 volts DC (regulated or unregulated), and provides 3.3 and 5 volts DC to the interface boards as necessary.

As noted, various input interface boards are available for populating the hub chassis, as required. One such board is referred to as a system card, which acts as an interface between an external control system, such as a personal computer, and the hub. Memories such as PROMs are utilized in conjunction with the various interface boards for identifying the type of each card and its location within the hub chassis. In one embodiment, a 1 kilobyte PROM preprogrammed with a unique code for identifying the type of interface card along with any other relevant information is accessed by the system card. This information, accessed in a preferred embodiment via an I$^2$C™ bus, or any other standard control bus, is utilized in configuring the interface cards, as will be discussed in further detail below. The system card also enables input of control data from the external control system which specifies what portion of an input data stream is to be used as overlay data, what portion of the overlay data is to be displayed within the base image, and where within the base image the portion of overlay data is to be merged. The video clock and sync signals utilized throughout the hub are distributed by the system card, as are control signals utilized for configuring other cards populating the hub.

Other input cards which can be selectively employed in the hub include an analog card for receiving an analog video signal, such as an RGB signal from a PC graphics card, and for writing the reformatted and buffered video data onto the pixel bus as a base image. A computer overlay card provides a similar function, but further enables the selective capture of input data in defining overlay data, and the selective display of the captured data as an overlay within the base image. A broadcast video, or baseband composite video, ("BVIDEO") overlay card provides the same function for a received broadcast video input stream. A serial data input card interprets graphics commands for the generation of a buffered image capable of being driven onto the pixel bus as an overlay.

A data exchange card can function as either an input to or an output from the hub. It provides buffering for data flowing in either direction, to or from the pixel bus, along with data handling in the case where the data exchange card is interfacing the pixel bus to an asynchronous bus.

Each of these input cards is provided with a control portion for receiving a pixel clock and various video sync signals from the system card. Alternatively, in the case where the respective input card is acting as the source of a base image, the respective control portion sends the recovered clock signal and sync signals to the system card for distribution to the other interface cards.

The control portion of each input overlay card is programmed by the system card, under control of the external control system, to identify which portion, if any, of the respective input card's buffered video data is to be provided to the pixel bus. When the respective control portion commands the output of buffered data onto the pixel bus, the control portion is responsible for asserting a signal which indicates to all other cards that it is presently writing to the pixel bus.

Various output cards are available for receiving pixel data from the pixel bus and for providing the data to an interconnected video display device. For instance, a PANELLINK™ interface card includes at least one PANELLINK™ interface for converting the pixel data from the pixel bus into a PANELLINK™ format. This interface card also provides a serial bus for addressing a frame buffer located in the interconnected video display device, and a serial bus for displays supporting Display Data Channel (DDC). Power for the video display device is also provided through a connector located on this interface card. The output from such an interface card can also be utilized to provide an input to another hub.

Another PANELLINK™ interface card also receives pixel bus data, but provides a frame buffer on the interface card for identifying a portion of the pixel data which is desired to be displayed on an associated video display device after being converted to an industry standard PANELLINK™ format. As above, this card also provides a serial bus for displays supporting DDC.

A CRT interface card also receives pixel bus data, selectively stores it in a frame buffer memory, and converts the data to be displayed into an analog signal such as required to drive a standard CRT terminal. Control circuitry may be provided on this interface card, depending upon the embodiment, if the monitor is DDC compliant for providing timing information to the CRT interface card.

Thus, the presently disclosed invention enables a fully configurable video distribution hub for receiving and selecting from among plural, disparate video input sources, for providing one of the sources as a base video image, for merging one or more of the remaining video sources as overlays on the base video image, and for driving at least a selectable portion of the base image and any overlays on one or more interconnected video display devices. Additionally, the base image can be generated within the hub without reliance upon an external source.

BRIEF DESCRIPTION OF THE DRAWINGS

The invention will be more fully understood from the following detailed description taken in conjunction with the accompanying drawings in which:

FIGS. 1A–1D illustrate the contents of a video buffer divided among two or more portions which are subsequently displayed on respective display devices in a variety of configurations, as enabled by the present invention;

FIG. 11 illustrates the Analog Front End of FIG. 4;

FIG. 12 illustrates back porch clamp timing;

FIG. 13 illustrates the function of the A/D of FIG. 4;

FIG. 14 is an equivalent circuit of the phase fine tune block of FIG. 4;

FIG. 15 illustrates interconnected switches employed in the video clock regenerator circuit of FIG. 4;

DETAILED DESCRIPTION OF THE INVENTION

Figure 2:
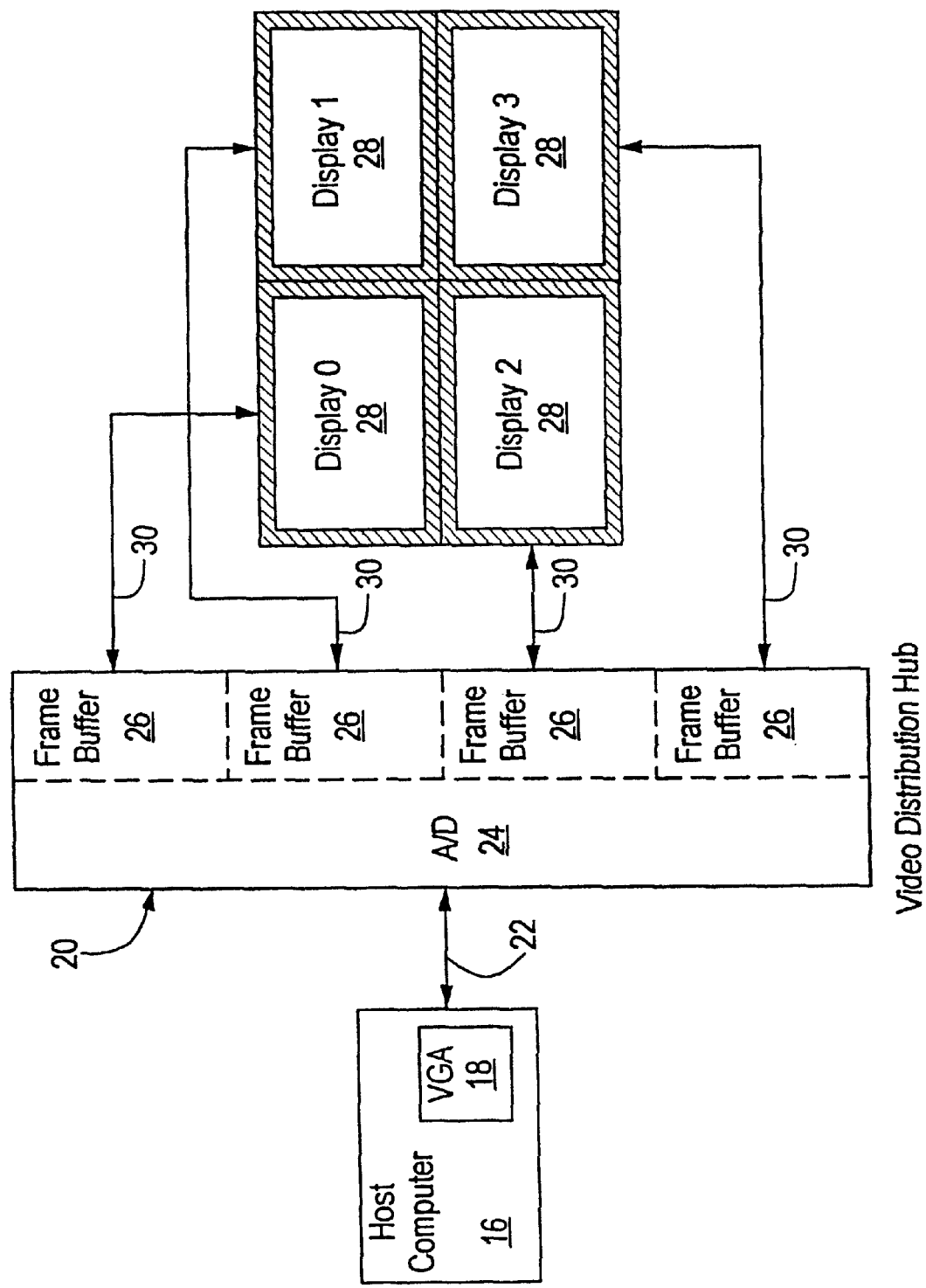
FIG. 2 is a top-level block diagram of a video distribution system according to the present invention.

A common video graphics adapter for coupling a host computer such as a personal computer (PC), workstation, microcomputer, minicomputer, mainframe or the like to a video display typically provides an "oversize" display buffer which has a buffer capacity greater than that necessary to drive a single, conventionally-sized video display. This oversize display buffer and the data contained therein is illustrated in FIGS. 1A–1D as a large field 10 of video data available for display.

As previously indicated, it is often desirable to simultaneously display two or more portions 12 of this adapter buffer field 10. In FIG. 1A, it is desired to take four non-contiguous, horizontally oriented portions 12a–12d from the adapter buffer field 10 and to display them on adjacent display devices. In FIG. 1B, it is desired to take two vertically-oriented portions 12e, 12f from the same video graphics adapter buffer field 10 and to display them on adjacent, vertically-oriented displays. In FIG. 1C, a mix of vertically- and horizontally-oriented portions 12g–12j are taken from the same adapter buffer field 10 and are subsequently displayed with the vertically-oriented portions 12g, 12j spatially displaced from the horizontally-oriented portions 12h–12i. Finally, in FIG. 1D, two horizontally-oriented portions 12k, 12l are taken from the same buffer field 10 and are then displayed on adjacent displays. In the latter case, each portion has a common, overlapping region 14 of video information.

For all of the foregoing examples, the present invention enables the simultaneous replication of multiple portions of a single oversize display buffer. The prior art, in contrast, requires the use of multiple video graphics adapters, each providing a buffer field for sourcing a respective buffer portion, particularly in the situation of FIG. 1D in which two portions to be displayed share a common region 14 of video information. The typical prior art video graphics adapter can also be used to provide video data to plural displays, however, the image displayed on each is the same.

The present invention is illustrated from a macroscopic point of view in FIG. 2. A host computer 16 provides input data to a video graphics adapter (VGA) 18 via a host computer interface such as a PCI bus. The VGA 18 is typically a circuit board installed within the host computer 16, though other physical embodiments and placements are envisaged. The graphics adapter 18 is used to generate text and graphical video data from the input data, and to make such video data available to display devices in an internal video display buffer.

In the prior art, the digital video data in the video display buffer is converted by the VGA 18 to an analog signal comprised of components for each of the fundamental colors employed by conventional display devices, red, green and blue (RGB). This analog signal is then available for conveyance to a conventional display device through a video data cable.

In the present invention, the video data in the video display buffer is received by a video distribution hub 20 via a video cable 22. Depending upon the protocol, horizontal sync (HSYNC) and vertical sync (VSYNC) are derived locally in the hub 20 from the analog RGB video data and/or through additional sync signals conveyed through the video data cable 22, as discussed subsequently. The video cable 22 also provides a DDC (display data channel) bus, a VESA (Video Electronics Standards Association) standard bus, for the purpose of enabling configuration control between the host computer 16 and the hub 20. Additionally, in a further embodiment, the video cable 22 provides a USB (Universal Serial Bus) connection between the host computer 16 and the hub 20, also for the purpose of configuration control. In a first embodiment, however, the USB connections are for future expansion and are terminated in a resistor pad found in conjunction with frame buffer circuitry, discussed subsequently.

The hub 20 is comprised of two major circuit blocks, an analog-to-digital (A/D) front end 24, and plural frame buffers 26. The A/D section 24 converts the color data for each of the RGB colors into a digital representation, and provides temporary storage for this digital data. There is one frame buffer per color per associated display device 28, or head; the frame buffers are each comprised of data gate arrays (to be discussed subsequently) which enable the storage of a selected portion of the video data coming from the VGA 18 in a local memory. The selected portion then is read out of the memory and is made available to the respective head 28 through a frame buffer output interface and associated cable 30.

The hub is an enclosure having approximate dimensions of seven inches in width, one inch in height, and nine inches in length, though other hub embodiments assume other relative and absolute dimensions. Heat relief is provided as required. Physical interfaces include an input port for receiving the RGB video stream over the video cable 22, a power supply connection for interfacing to a +12 V unregulated (or regulated) power supply (not shown), and output ports for each frame buffer 26 enabling interconnection of the display device cable 30. LAN ports, such as a BNC connector and RJ45 connector, enabling intercommunication between plural hubs are also provided in one embodiment. A serial port is also provided, enabling a remote host (not necessarily the same host as that which houses the respective video graphics adapter) to provide command and control data to the hub, and to return data. This serial link can be used, for instance, to command the hub to initiate communication over the LAN with other LAN-connected hubs. In an exemplary embodiment, this serial port is an RS232 port.

In a preferred embodiment, the A/D section 24 and two of the frame buffers 26 are disposed on a first circuit card within the hub 20. Two further frame buffers 26 are located on a separate circuit card, also within the hub 20. In addition, in a further embodiment of the present invention, up to eight frame buffers are supported within the hub, all interfacing through a single A/D 24. Physical dimensions for such a hub 20 would of course be adjusted to accommodate the additional circuit cards.

Figure 3:
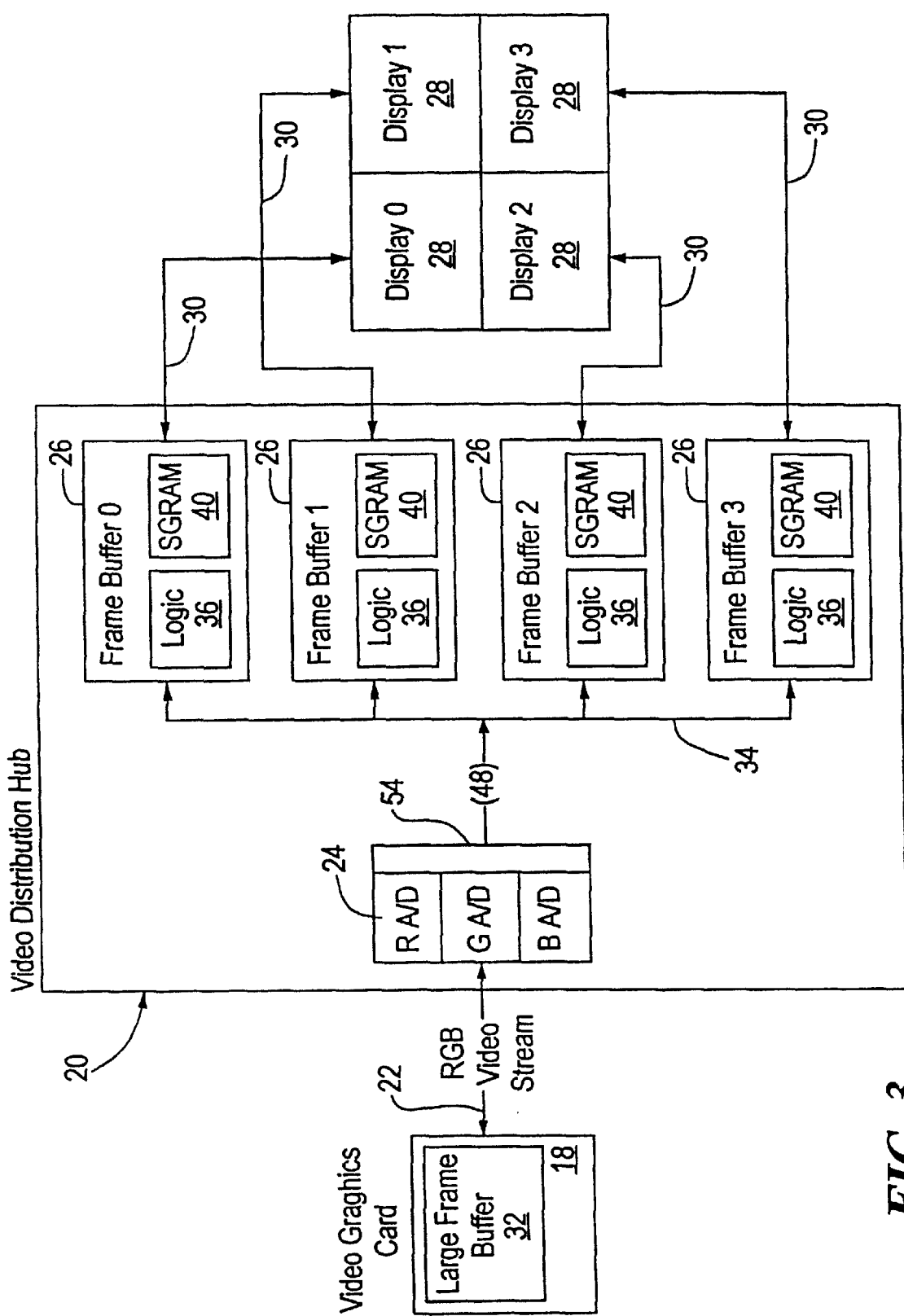
FIG. 3 provides a more detailed view of the block diagram of FIG. 2.

The present invention is discussed at a more detailed level with respect to FIG. 3. Here, the video display buffer 32, otherwise known as a large frame buffer, is illustrated in association with the video graphics card 18. Again, the RGB video data is illustrated as being conveyed from the video graphics card 18 to the hub 20, and in particular to the A/D section 24. Further detail on the A/D section is presented below.

Between the A/D section 24 and the plural frame buffers 26 is an internal bus 34. As shown, this parallel bus is 48 bits wide; there are eight bits per pixel per each of the three colors, or twenty-four bits per pixel, and it is desired to transmit two pixels per clock cycle. Over this bus 34 flows all of the digitized video data which corresponds to the complete contents of the video display large frame buffer 32 as received by the A/D section 24. It is within the frame buffer 26 logic that the determination of where to begin storing data and where to stop is made. By starting and stopping the storage of video data, each frame buffer section 26 is capable of providing to the respective video head 28 only that portion 12 of the total video display buffer 32 which is desired.

In FIG. 3, the frame buffers 26 are each illustrated as being comprised of a logic section 36 and an SGRAM (synchronous graphics RAM) 40. Essentially, the logic 36 is responsible for storing in the SGRAM 40 only video data associated with the video buffer portion 12 desired to be displayed on the respective display device 28. The SGRAM 40 provides temporary storage of this data to enable the timely provision of the data to the respective head 28. As will be discussed subsequently, there is logic and SGRAM associated with each color for each of the display devices.

Figure 4:
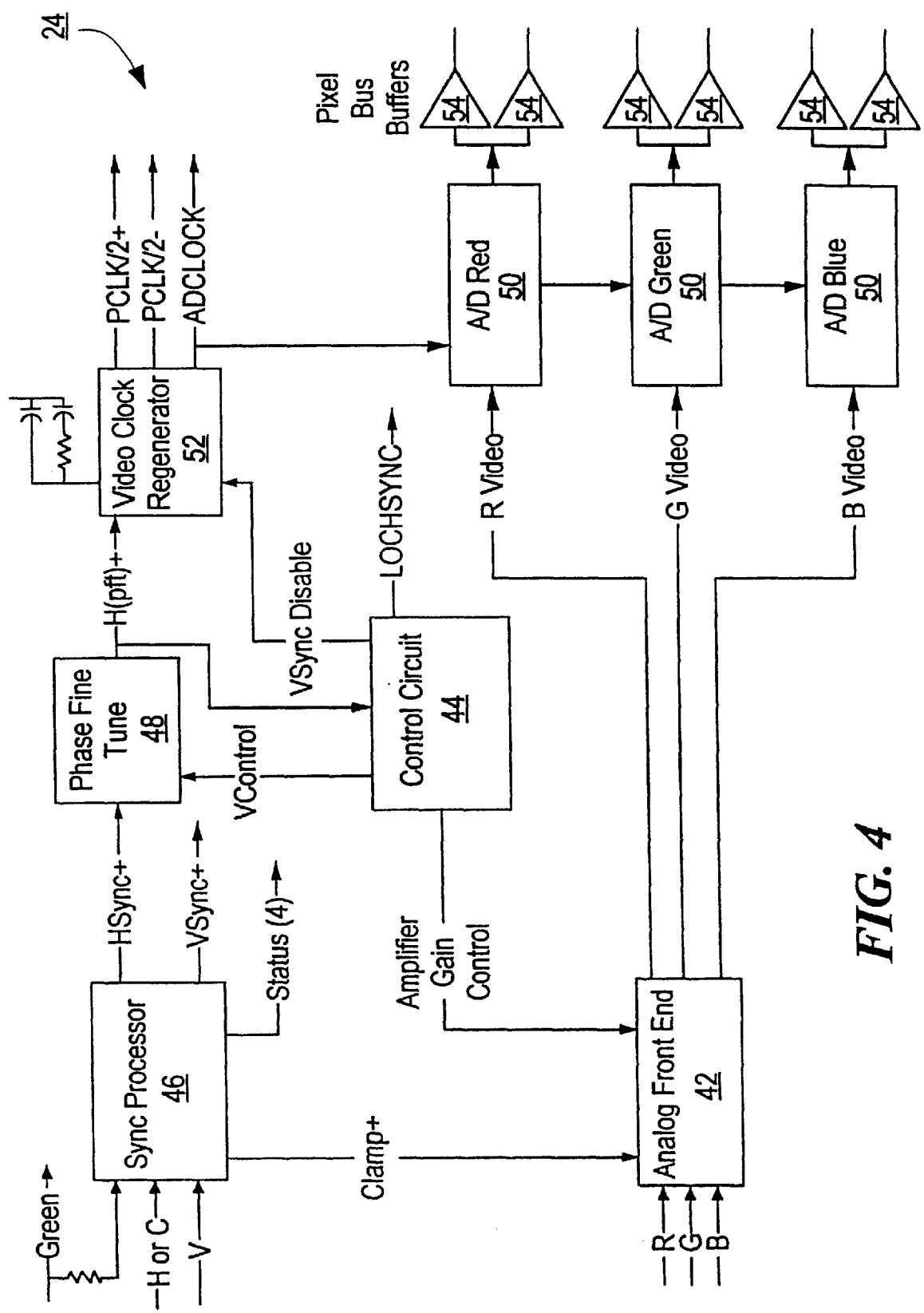
FIG. 4 is generally a block diagram of the block labelled "A/D" in FIG. 3.

With respect to FIGS. 4 and 11, the A/D section 24 is described in detail. An analog front end 42 AC couples the received analog RGB signal from the video cable 22. After being coupled in, the video signal for each color is approximately 0.7 Vpp, from the darkest to lightest extremes. Therefore, it is necessary for the analog front end 42 to amplify the video signal for each color, thus improving the signal to noise ratio (SNR) of the following A/D converters (ADCs) 50. Suitable video preamps for this purpose include the National LM 1205 and LM 1283.

Gain control for these amplifiers (one per color) can be either fixed or variable, depending upon the embodiment. Most simply, the gain control is fixed by the factory. In a further variant, the gain control is fixed in the factory, though the user has physical access to a gain control adjusting means.

In another embodiment, the gain control is variable and is controlled by a control circuit 44 in the A/D section 24 having a digital to analog converter (DAC) for generation of the control signal. An appropriate D/A for this purpose is the Analog Devices AD8403AR10. The gain control (also referred to as contrast control) is adjusted jointly for all three amplifiers (i.e. each of RGB). In addition, there are manual, independent balance adjustments for each of the colors.

One A/D per color is employed in the embodiment of the present invention. An alternative embodiment employs pixel merging due to the compression afforded by this technique. Pixel interleaving is described in commonly assigned U.S. patent application Ser. No. 08/538,116 entitled "Video Interface System Utilizing Reduced Frequency Video Signal Processing," incorporated herein by reference. In a third embodiment of the present invention not employing such interleaving, two A/Ds per color are used for video rates above 75 MHz.

Since the analog input is AC coupled, it is necessary for the analog front end 42 to also perform DC restore in order to establish a reference level in the amplified analog signal, for each of the colors. A back porch clamp is employed for the purpose of clamping the amplified input signal to a known reference during a clamp interval, and is illustrated in FIG. 12. Other clamping or DC restore techniques can be employed.

In the preferred embodiment, eight bits per primary color are digitized. A suitable device for the A/Ds 50 includes the Philips TDA8714. In an alternative embodiment, six bits are employed for color representation. The choice hinges upon desired (or required) color depth.

The eight-bit video data representations per color are clocked into two banks of pixel bus buffers 54. One pixel's worth of data is clocked into one bank of buffers 54 on even pixel clock cycles, while another pixel's worth of data is clocked into the other bank of buffers 54 on odd pixel clock cycles. Suitable buffers for this function include 74LVT574SM chips from Texas Instruments.

Also in the A/D circuit block 24 is a sync processor 46, such as a Mitsubishi M52347SP. There are three common video sync protocols. In the first, each of HSYNC and VSYNC are provided separately as digital signals between 1–5 Vpp. In the second, a composite digital sync signal is provided on the HSYNC signal line. Lastly, an analog composite sync signal is extracted from the green analog signal ("sync on green", or "SOG"), with a negative polarity for positive video. Inputs to the sync signal processor 46 therefore include externally received HSYNC and VSYNC, as well as the green analog input signal. The sync processor 46 is configured to automatically select a suitable one of these protocols.

Outputs of the sync processor include: HSYNC+ and VSYNC+, correlating to HSYNC and VSYNC signal timings, respectively; CLAMP+, used by the analog front end 42 in timing the DC restore, as previously discussed; and status bits usable by local processing to indicate what sync type was input to the sync processor 46.

HSYNC+ is used as an input to a phase fine tune (PFT) circuit 48. The PFT 48 adjusts where the video signal is sampled by the ADC 50 within a pixel lifetime by employing an adjustable delay of HSYNC+. The output of an RC charging circuit such as that shown in FIG. 14 is compared, using for instance an Analog Devices AD9696, with a control voltage generated by the control circuit 44 in the generation of H(pft)+. An external adjustment such as an encoder is provided on the exterior of the hub 20 chassis to enable manual adjustment of the control voltage, in an illustrative embodiment. Other encoders exist, such as those on the attached heads 28. The state of these encoders is also reported back to the control circuit 44. Therefore, the present invention is responsive to adjustment of PFT at either a central location such as the hub, or remotely, such as at the heads.

Also within the A/D circuit block 24 is a video clock regenerator circuit 52 including a fully programmable clock regenerator such as an ICS1522 made by Integrated Circuit Systems, Inc., a phase locked loop (PLL) frequency synthesizer. The clock regenerator is serially programmed in a preferred embodiment of the present invention by the control circuit 44 to generate four clock outputs, each at ¼ the sampled pixel rate and 90 degrees out of phase with the following output, which collectively comprise a clock at the sampled pixel rate. Various frequencies are employed, depending upon the video data rate. For illustrative purposes, 75 MHz is used herein.

In addition to the clock regenerator/frequency synthesizer, the clock regenerator circuit 52 is comprised of a MOSFET bus switch, such as a Texas Instruments 74CBT3125 quad bus switch. The purpose of the MOSFET bus switch is to generate two 75/2 MHz clocks, 180 degrees out of phase with other, from the four 75/4 MHz staggered clock signals from the clock regenerator/frequency synthesizer.

With respect to FIG. 15, four switches are provided in the 74CBT3125 bus switch used in the preferred embodiment. Each switch is a MOSFET switch having an inverted-input output-enable associated therewith. The first clock signal from the clock regenerator is fed to the input of the first switch, and the second clock signal, 90 degrees out of phase (lagging) with the first clock signal, is connected to the output enable for the first switch. The third and fourth clock signals are connected to the second switch in a similar manner. The outputs of the first two switches are then tied together, providing an output clock with clean rising edges due to the speed of the switches and having a period of 75/2 MHz.

Likewise, clock two is connected to the input of switch three, and clock three is connected to the output enable of switch three. Clock four is connected to the input of switch four, and clock one is connected to the output enable of switch four. The outputs of switches three and four are also tied together. The resulting output is also a 75/2 MHz clock signal, though 180 degrees out of phase with the output from the first two switches.

Each of the 75/2 MHz outputs from the bus switch are used to clock a respective PLL clock driver such as the CDC536 from Texas Instruments as part of the video clock regenerator 52. This part enables the generation of a doubled output, a 75 MHz clock also referred to as the ADCLK or "dot clock", which is used to clock the ADCs 50. Once again, other frequencies are employable as required.

In addition, the clock driver provides 75/2 MHz clocks ("PCLK/2+" and "PCLK/2−") of like phase with respect to the clocks from which they are derived. Such clocks are used to clock the pixel bus buffers 54 latching digital video data out of the ADCs 50, since data gate arrays in the frame buffer logic 36 can't run at speeds such as 75 MHz (data gate arrays are discussed later).

In the first embodiment of the present invention, the sampling rate does not exceed 75 MHz, with the limitation being found in the analog preamplifier of the analog front end 42 and in the speed of the ADCs 50.

The clock regenerator circuit 52 also enables the regeneration of HSYNC, in a form referred to as LOCHSYNC, or local HSYNC, even without an external HSYNC. Thus, an on-screen display chip is utilized in a further embodiment of the present invention for the generation of on-screen menus. LOCHSYNC is employed by the control circuit 44 in controlling the output of the frame buffers 26.

The on-screen display chip (not illustrated) is employed in the A/D circuit block 24, and specifically, in conjunction with the analog front end 42. Analog output from this chip is mixed into the A/Ds 50. A single user interface to this chip is provided.

In one embodiment of the present invention, control over when and for what duration a frame buffer 26 captures video data resides within the A/D circuit block 24, and in particular within the video clock regenerator 52 using gating signals. However, since such signals would only gate one frame buffer 26, such embodiment is not preferred.

The control circuit 44 provides a VSYNC disable to the video clock regenerator 52 to disable the PLL during vertical intervals. Otherwise, spikes generated by the PLL in the vertical interval would cause errors in forward error correction.

Functions of the control circuit 44 in the A/D circuit block 24 have previously been alluded to, such as the generation of the analog preamplifier gain control, creation of VControl for use in the PFT 48, generation of the Vsync disable and serial data signals for use in the video clock regenerator 52. Structurally, the control circuit comprises in a preferred embodiment the following elements.

As discussed, a DAC is required in the generation of amplifier gain control. Other elements comprising the control circuit include a serially programmable digital potentiometer, such as an Analog Devices AD8403AR10, which enables the generation of A/D circuit-internal control signals such as: CONTRAST, an adjustment to the video preamp in the analog front end 42; CLAMP_WDTH, used in the sync signal processor; and the PFT control signal previously discussed.

Primarily, however, the control circuit is comprised of a C25 microprocessor with an XC5202 microprocessor gate array. Principal signals received by the control circuit 44 include clocks from the video clock regenerator 52, and HSYNC+ and VSYNC+ from the sync processor 46. Clearly, in the actual implementation, there is a much higher degree of interconnectivity than that which is alluded to here.

For the purposes of programming the control circuit 44, a serial PROM and a parallel EEPROM provide data to the gate array and microprocessor, respectively. The use of the parallel EEPROM enables the reprogrammability of the hub. Further, the microprocessor and associated gate array are in communication with devices external to the hub 20 via a serial port disposed on one end of the hub 20. A UART (universal asynchronous receiver/transmitter), such as a TL16C550A, and a TTL to EIA level translator such as an MAX211E, enable this serial communication.

The control circuit is also in communication with devices external to the hub 20 through LAN ports, such as BNC or RJ45 connectors. Standard LAN interfaces are employed in a preferred embodiment, such as an SMC91C94 LAN chip, coupled to a DP8392 encoder. Such a LAN interface enables programmability of the hub 20 as an addressable port on a LAN shared by devices other than hubs, or as a port on a LAN dedicated solely to one or more hubs in communication with a configuring device or devices. In either case, the hub 20 is a "dumb" device which only responds when directed to from an intelligent device. The serial communication can be either 10Base2 or 10BaseT.

Finally, as previously noted, a DDC bus enables configuration of the hub 20 by the host computer 16. This bus is comprised of two data signals, SDA (serial data) and SCL (serial clock), +5 VDC, and return. The DDC channel is normally employed, in the prior art, as a unidirectional pathway to a repository of peripheral device configuration information available to a host. Here, however, the C25 processor reads and writes the DDC memory dynamically with information pertaining to the configuration of the hub and the attached heads. The DDC memory, which can be discrete or part of the control circuit memory, is then read by a host.

Therefore, the control circuit can be configured, or reconfigured, via internal replacement of programmed memory devices, external communication to removable configuring devices such as via a LAN interface, or by input from the host computer. Such configuration information can include, explicitly or implicitly, the point (row and pixel) within the frame at which each displayed segment is to begin.

From the A/D circuit block 24, digital video data is provided in parallel as eight bits per color per pixel, with two pixels being provided per clock cycle, for a total of 48 bits. Other signals which are provided by the A/D circuit block 24 include: USB signals, which are for future expansion in the present embodiment and are therefore terminated at a daughter board connector proximate the frame buffer circuitry; horizontal and vertical sync signals from the sync signal processor 46; various clock signals originating in the video clock regenerator 52; a start of frame signal generated by the control circuit 44 from the horizontal and vertical syncs; and serial control data also generated by the control circuit 44.

Figure 5:
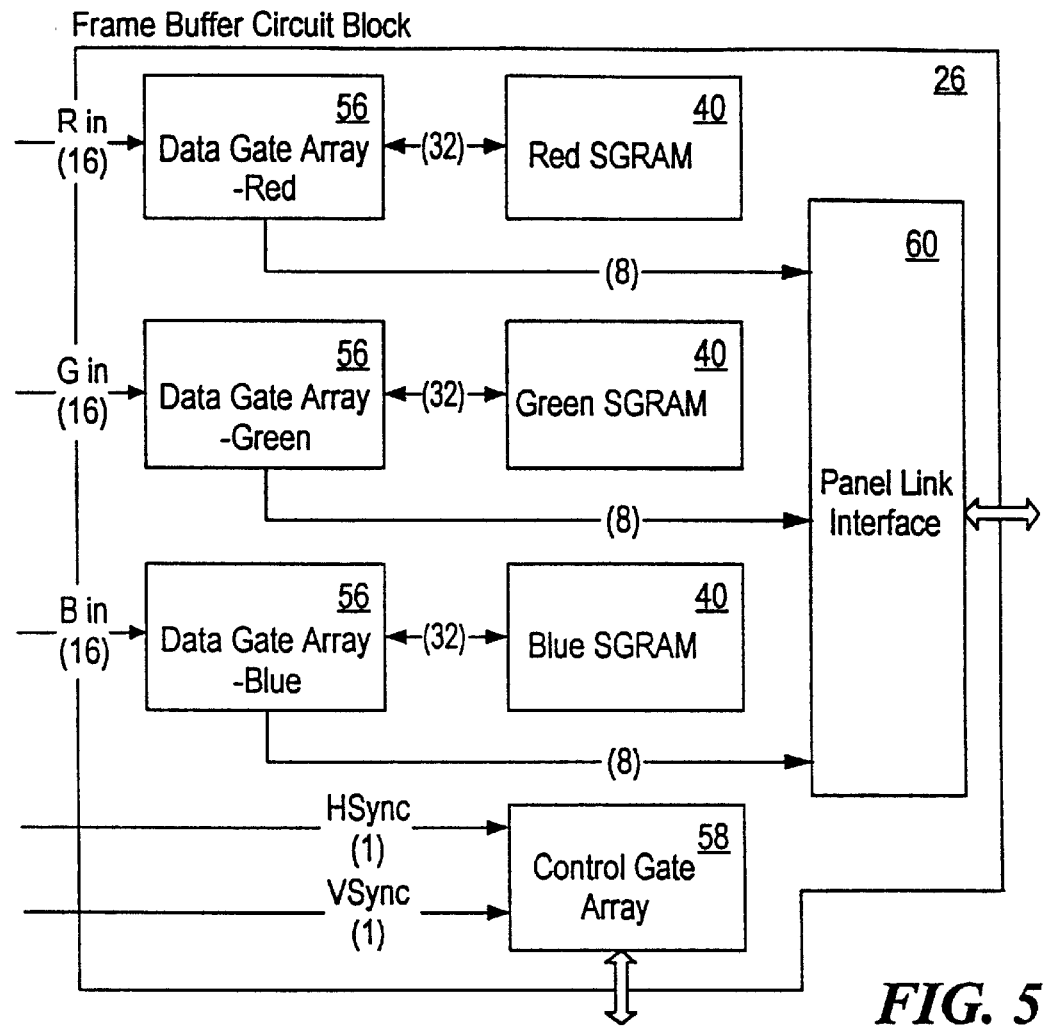
FIG. 5 is generally a block diagram of one of the blocks labelled "Frame Buffer" in FIG. 3.

One frame buffer circuit block 26 is illustrated in FIG. 5 at a first order of detail, bearing in mind that there are up to four frame buffer circuit blocks 26 in each hub in a first embodiment, each capable of providing digital video data to a respective display head 28.

Sixteen parallel bits of video data per color (two pixels) are received by a respective data gate array 56. The data gate array 56 enables the storage of the video data in the respective SGRAM 40 if the data is part of the desired portion 12 of the video display buffer in the VGA 18, based upon control received from an associated control gate array 58. In the preferred embodiment of the present invention, there is one control gate array 58 per frame buffer logic circuit 36, though in an alternative embodiment, one control gate array 58 is shared between two frame buffer logic circuits 36.

If the video data is desired for display on the associated head 28, the data is stored in the respective, single-ported SGRAM 40. As required, the data is then removed from the SGRAM 40 where it passes again through the data gate array 56 to the PANELLINK™ 60, the latter acting as an output interface to the associated head 28.

Figure 6:
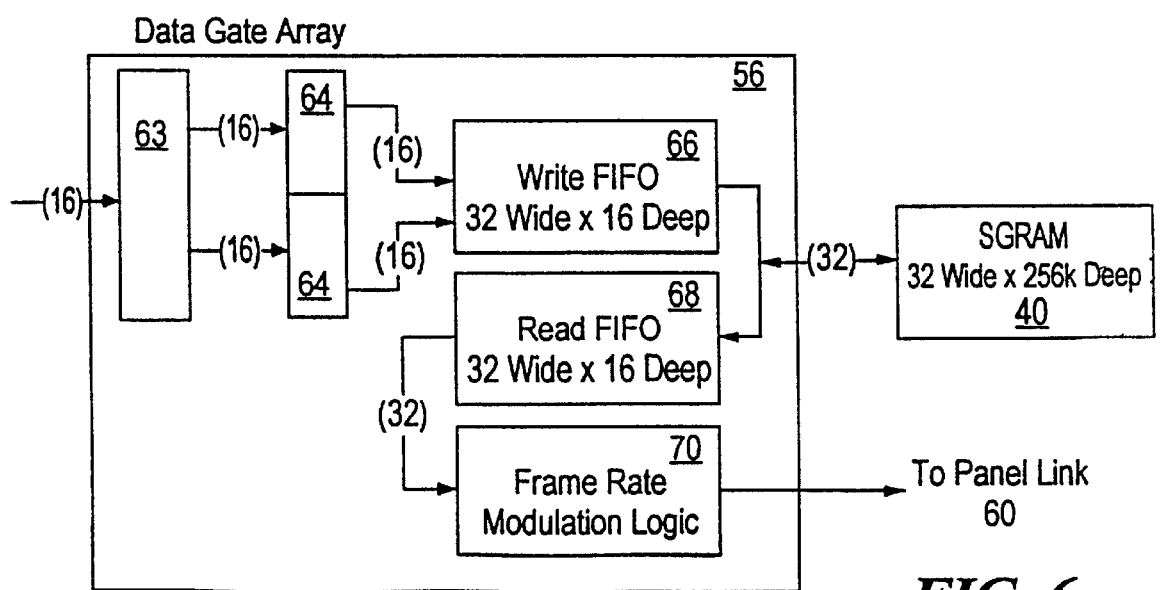
FIG. 6 is generally a block diagram of one of the blocks labelled "Data Gate Array" in FIG. 5.

On a more detailed level, FIG. 6 provides an illustration of a data gate array 56 and an associated SGRAM 40 for a single color channel. Video data input to the data gate array 56 for one of the three colors, two parallel eight-bit pixels, is received on sixteen parallel signal paths at approximately 80 MPixels/sec (or 40 MPixelPairs/sec) within a demux 63 in the data gate array 56. This demux 63 enables the distribution of the input data into two sixteen bit registers 64, which in turn provide thirty-two bit parallel data to a 32 bit wide, 16 bit deep write FIFO 66.

Figure 7:
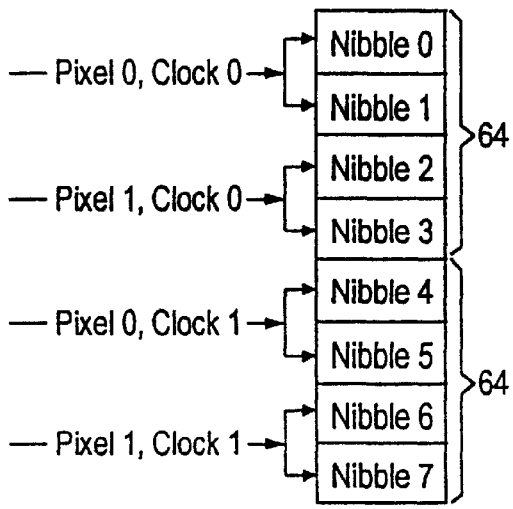
FIG. 7 illustrates data distribution during data gate array register loading for data driving an active matrix display.
Figure 9:
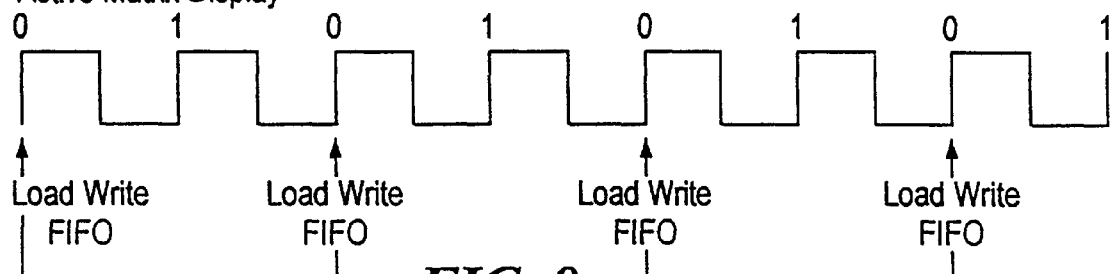
FIG. 9 illustrates the timing of data transfer within the data gate array of FIG. 6 for data driving an active matrix display.

How the data is transferred into the registers 64 depends upon the type of head 28 associated with this color channel as conveyed by the head 28 to the control circuit 44 (via the DDC backchannel) through the serial port to the control gate array 58 (on a separate serial bus). For an active matrix LCD display, all eight bits per pixel are utilized. As shown in FIGS. 7 and 9, the upper of the two registers 64 is filled with four four-bit nibbles during clock cycle zero, representing two eight-bit pixels for this color. On clock cycle one, two more pixels are loaded into the lower sixteen-bit register 64. On the following clock cycle, clock cycle two, the 32 bits of data representing four pixels for this color are clocked into the write FIFO 66 and the upper register 64 is written with the next two pixels. The clock speed into the write FIFO 66 is 20 MHz for active matrix displays in the first embodiment of the present invention. Other exemplary embodiments employ other clock speeds.

Figure 8:
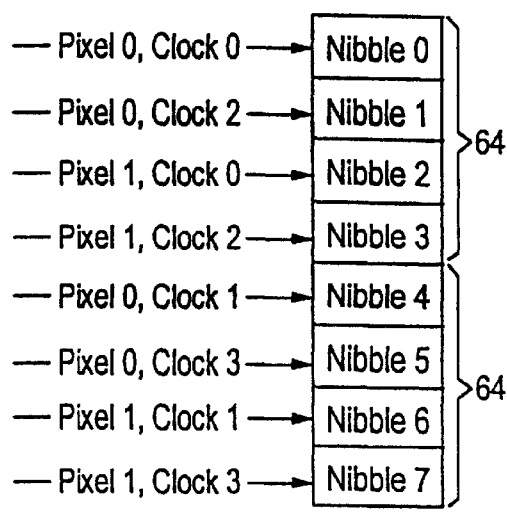
FIG. 8 illustrates data distribution during data gate array register loading for data driving a passive matrix display.
Figure 10:
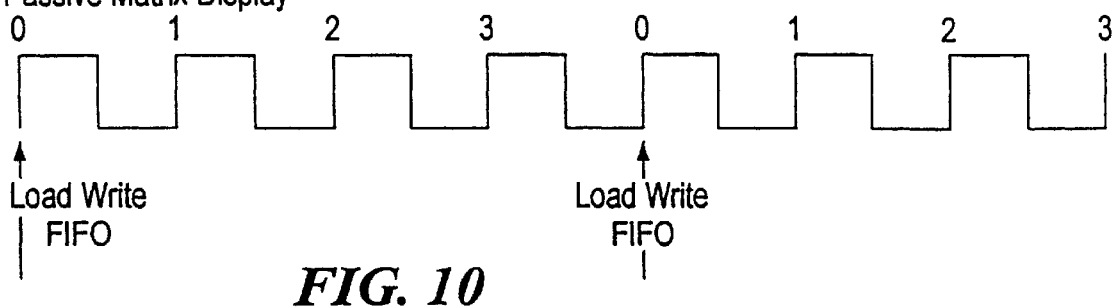
FIG. 10 illustrates the timing of data transfer within the data gate array of FIG. 6 for data driving a passive matrix display.

If the associated head 28 is a passive matrix display, the lower four bits of each eight bit pixel are dropped and the upper four bits are clocked into the registers 64 as indicated in FIGS. 8 and 10. On successive clock cycles, the upper four bits for each pixel are stored in respective portions of the registers 64, while the lower four bits are dropped. On clock cycle four, the data in the registers 64 are clocked out to the write FIFO 66 and the process of receiving the upper four bits per pixel in the registers 64 begins again. The clock speed into the write FIFO 66 for passive matrix displays is 10 MHz.

The output of the write FIFO 66 is connected to a 32-bit data path. Also connected to this data path are the respective single-ported SGRAM 40, which is 32 bits wide by 256 kbytes deep, and a read FIFO 68 of the same dimensions as the write FIFO 66. A suitable SGRAM 40 for this application is an IBM038329N06A-10, which operates at 50 MHz. Desired video buffer portion 12 data from the write FIFO 66 is read into the SGRAM 40 under the control of the control gate array 58.

In a first embodiment of the present invention, data out of the write FIFO 66 is written to the SGRAM 40 for eight clock cycles, the 32-bit wide bus is idle for two clock cycles, data is read out of the SGRAM 40 and into the read FIFO 68 for eight clock cycles, then the bus goes idle for another two clock cycles. The desired portion 12 data can be any contiguous portion of the video buffer data from the video graphics adapter 18 in the host computer 16, limited maximally in size by the characteristics of the associated head 28.

When and how much data is stored in the SGRAM 40 is mandated by the control gate array 58. In a first, preferred embodiment of the present invention, the control circuit 44 in the A/D circuit block 24 provides the control gate array 58 in the frame buffer logic block 26 with horizontal and vertical offsets, relative to the start of frame notification, via the serial data path between the two for the commencement of data storage in the SGRAM 40. These offsets are used to control a video microsequencer implemented in the control gate array 58 for enabling the transfer of digital video data into the video registers 64, and subsequently into the write FIFO 66. A memory controller, also implemented in the control gate array 58, controls the transfer of data from the write FIFO 66 to the SGRAM 40, and from the SGRAM 40 to the read FIFO 68. Finally, a panel microsequencer, again, implemented in the control gate array 58, controls the output of data from the read FIFO 68 to Frame Rate Modulation (FRM) logic 70 (discussed subsequently).

The benefit of providing these three independent elements, the video microsequencer, the memory controller, and the panel sequencer, lies in that the writing of data can take place at a different rate than the reading of data; the memory controller effectively disconnects the potentially disparate write and read function rates.

The programming of the video microsequencer with the offset information is preferred due to the ease of adjusting the offset values when a respective head is replaced or when the display characteristics for a head are changed. How much data to store is calculated by the control circuit 44 based upon display size, resolution, and orientation as learned from the respective head 28 via the DDC backchannel. The frame signal is used for interlaced video applications, the control gate array 58 using this signal to identify even versus odd frames.

In alternative embodiments, data storage in the SGRAM 40 is solely under the control of the control circuit 44, the latter sending the equivalent of "on" and "off" signals to the control gate array 58. A drawback of such control lies in the need for separate control lines between the control circuit 44 and each control gate array 58.

In yet another embodiment, the control circuit 44 provides "on" signals to the control gate array 58, and the control gate array 58 provides the "off" signal based upon backchannel information relating to the associated head 28. The multiplicity of control signals is once again a drawback of this embodiment.

The memory controller tracks the data flowing into and out of the FIFOs 66, 68 and the SGRAM 40. If the write FIFO 66 is less than half full, a write to the SGRAM 40 from the write FIFO 66 is disabled; if the read FIFO 68 is more than half full, the SGRAM 40 is prevented from writing to the read FIFO 68. The bus intermediate the FIFOs 66, 68 and the SGRAM 40 remains idle during the clock cycles which would otherwise be used for writing data from or reading data to the SGRAM 40.

From the read FIFO 68, data is clocked into a frame rate modulation logic circuit (FRM) 70 which formats the 32-bit wide data according to whether the associated head 28 is passive or active matrix, and outputs eight-bit wide data to the PANELLINK™ 60 associated with that frame buffer 26 (there is one PANELLINK™ 60 per frame buffer 26). For active matrix displays, the FRM 70 executes an algorithm which reserializes the input data by taking the four, eight-bit wide pixels, buffering them, and outputting the data as sequential eight-bit wide pixel data. The maximum input rate into the PANELLINK™ from the FRM 70 is up to 65 MHz in the present embodiment.

For a passive matrix array as the associated head 28, the FRM 70 executes a conversion algorithm which also receives 32 parallel bits, but in the form of eight, four-bit pixels. The algorithm converts the four bit pixels into one-bit pixels using frame rate modulation. This involves the use of a look-up table in the FRM 70 and the frame number which is passed from the A/D control circuit 44 to the control gate array 58 to the FRM 70. The algorithm effectively averages the color of the same pixel over time, and compares the possible values for this pixel against that of surrounding pixels to enable the use of one-bit per pixel with minimized visual artifacts. The output of the FRM 70 for an associated passive matrix display is eight parallel one-bit pixels. Alternatively, any suitable FRM technique may be employed.

In an alternative embodiment in which the speed of the SGRAM 40 is sufficiently greater than that currently available, the data format for an associated passive matrix display could be four eight-bit pixels in parallel into the FRM 70, instead of the current eight four-bit pixels.

In a passive matrix display, the frame rate is twice that of the active matrix display. Typical values are 120 Hz frame rate for a passive matrix display versus 60 Hz for an active matrix display. The chief advantage of passive matrix displays is cost; presently, such passive displays cost roughly one-third the cost of active matrix displays.

An active matrix display may take two pixels per clock cycle, in order. However, a "dual scan passive" display provides four one-bit pixels per clock cycle at both a top and bottom half of a display. Thus the difference in frame rate.

The PANELLINK™ 60 receives eight bits per pixel per color, or 24 bits per pixel total, at up to 65 MHz for an associated active matrix panel head 28, four times the FRM 70 input clock rate. The PANELLINK™ 60 receives pixel data for an associated passive matrix display at approximately 20 MHz, the same as the input rate into the FRM 70.

The PANELLINK™ 60, such as a Chips & Technologies 65100, formats the input data for provision to the respective head 28. It receives the three eight-bit data streams from the FRMs 70, one for each color, and using the HSYNC and VSYNC signals from the A/D control circuit 44 via the control gate array 58 formats the data for output over four differential lines at a connector to the respective head 28.

The PANELLINK™ provides its outputs to the respective head 28 over the display device cable 30 as four twisted pairs. This cable 30 also provides 12V power and ground, a USB backchannel (the latter not being employed in the present embodiment), and the DDC backchannel to the control circuit 40. Four of the twisted pairs are for the RGB data and data clock. One twisted pair is for the DDC backchannel. Another twisted pair is for the USB. Each of the USB and DDC backchannels provide individual data and clock paths, and share 5V, 12V and ground which are also conveyed in this cable to the respective head 28.

Other elements of the presently disclosed hub 20 include registers which preserve the setup information of the PANELLINK™ 60, data gate array 56, and other elements, as received from the control circuit 44.

Figure 16:
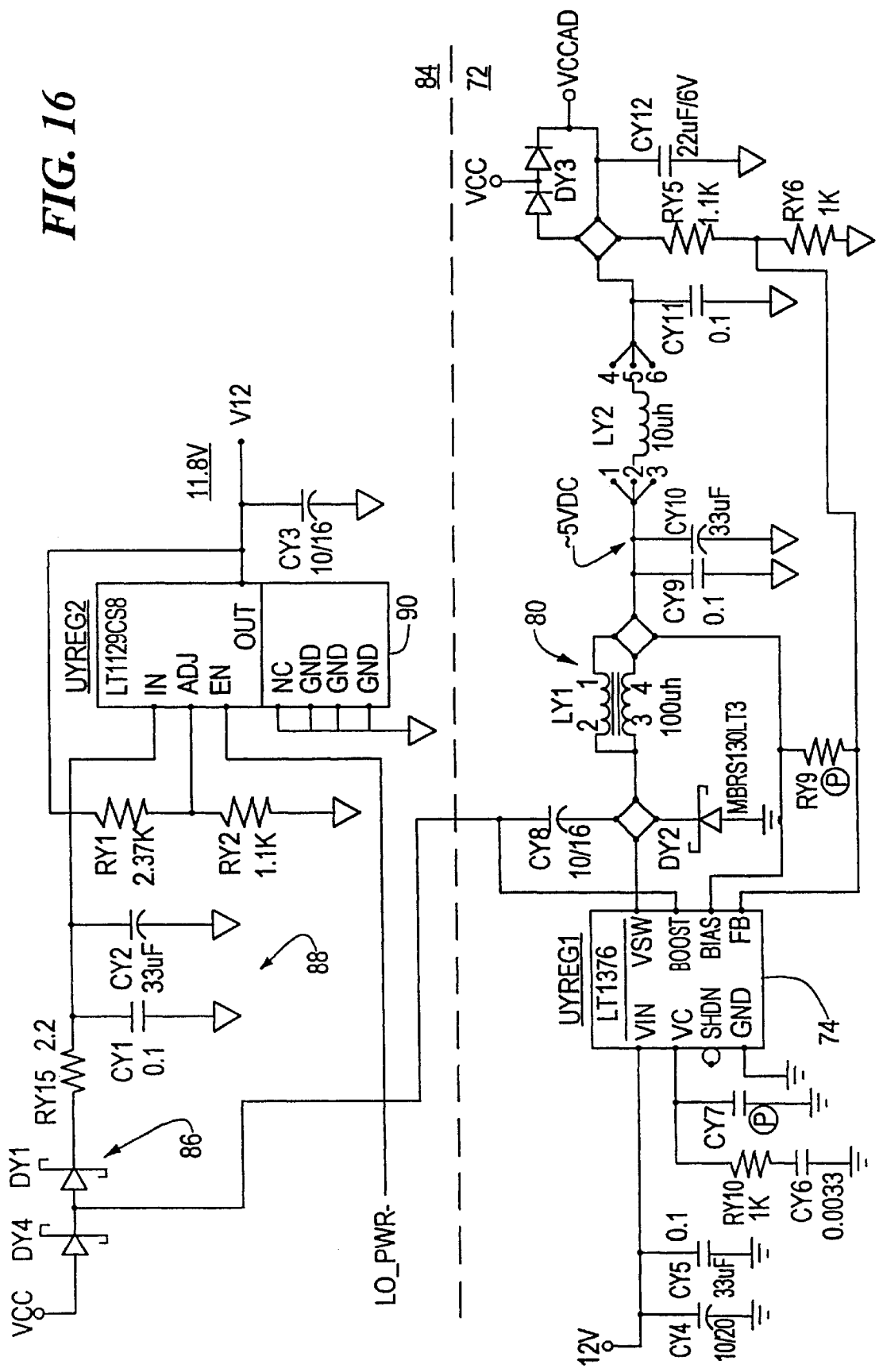
FIG. 16 is a schematic of a switching DC/DC converter used in the present invention with an integrated charge pump used to supply an auxiliary output.

The power requirements for the present hub 20 are unregulated 12 VDC. This is supplied to DC/DC converters which generate 5V and 3.3V for use as logic supplies. The unregulated 12 VDC is used as an input to an analog power and control circuit which includes a switching DC/DC converter 72, as shown in FIG. 16. The 12 VDC is applied to a buck switching regulator drive 74. This drive can take many forms, such as a switching regulator (e.g. a Linear Technology LT1376), or a regulator controller. The output of this drive 74, essentially a 12 Vpp rectangular wave, is coupled through an inductor 80 to a filter capacitor (or capacitors) 82 at the output of the inductor 80 in the common buck configuration, to supply 5 VDC for use in the analog section.

The output of the regulator drive 74 is also employed to drive a charge pump providing a higher-voltage input to an auxiliary DC supply circuit, generally designated 84 in FIG. 16. This circuit 84 includes alternately-conducting diodes 86, and one or more reservoir capacitors 88 coupled to a micropower low dropout regulator (e.g. a Linear Technology LT1129) 90, effectively providing a regulated, auxiliary 12 VDC output. Other voltages can be generated, depending upon system requirements.

In an alternative embodiment of the present invention, the hub 20 is configured to accept a digital video input. The data gate array 56 in this embodiment is configured to properly format the input digital data prior to its processing by the write FIFO 66, the SGRAM 40, the read FIFO 68, the FRM 70, and the PANELLINK™ 60. Such a hub 20 can be configured to accept either analog data input as previously described or digital data input, or can accept just digital data, eliminating some of the cost of the circuitry associated with the analog front end in the A/D circuit block 24. In an embodiment of the present hub 20 which accepts digital data directly, buffers such as the pixel bus buffers 54 are employed to temporarily hold the digital data prior to processing by the data gate array 56.

In yet further alternative embodiments, the digital output of the hub is employed as a digital input to one or more subsequent hubs. The PANELLINK™ interface 60 can also be replaced with D/A converters. Such an embodiment could then drive conventional CRTs, or could provide analog input to one or more subsequent hubs. Additionally, the inputs and outputs of the hub 20 can be adapted to receive and/or transmit data in an optical format.

In another embodiment, a configurable hub is provided which enables the merging of plural, disparate video inputs into a single pixel bus dataset, and the selective display of independent portions of that dataset on one or more display devices which themselves may have disparate input requirements.

Figure 17:
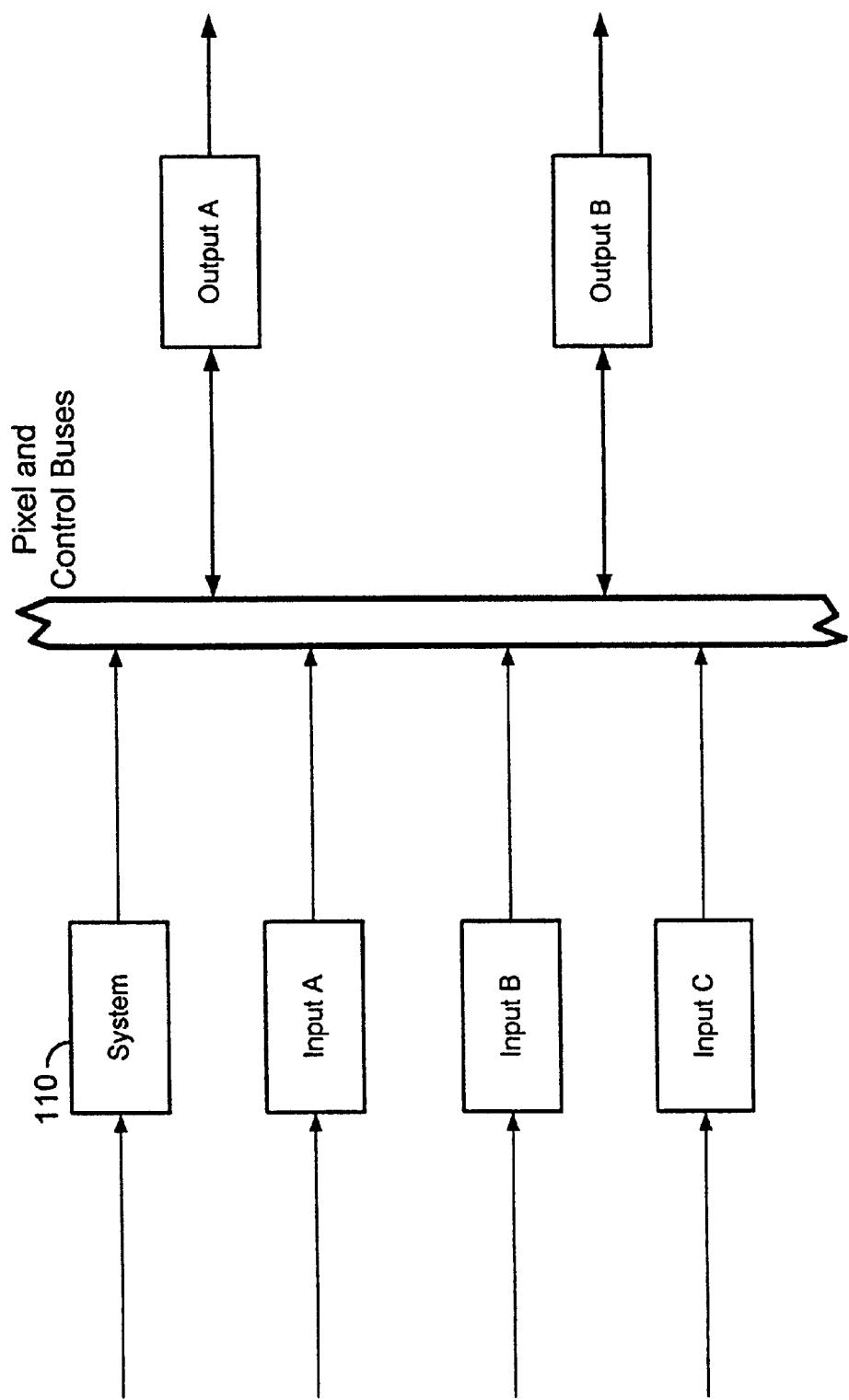
FIG. 17 is an overview of the connectivity and various interface circuit cards which can be utilized in an exemplary embodiment of a video distribution hub according to the present invention.

The configurable video hub of FIG. 17 illustrates a number of integrated circuit cards in mutual communication. Each of the cards will be discussed in detail subsequently. The purpose of the hub and cards installed therein is to accept base image data and/or data for one or more overlay images via input interface cards. The base image data, if any, defines the outer bounds of a video display dataset and is driven onto a pixel bus 114 and merged with the overlay image data, if any. At one extreme, no overlay data exists and the resulting pixel bus dataset is comprised only of base image data. At the other extreme, the base image data is completely replaced by overlay data. In between these extremes, the overlay data may appear as a window of overlay data amidst the base image. Further still, the base image may not be driven onto the pixel bus at all, such that the overlay data is driven onto the pixel bus amidst a default video display value representing the area the base image would otherwise occupy. In one embodiment, this default value results in the display of a black pixel within the base image field in each location where an overlay pixel is not merged.

A system card 110 is installed in each hub for control purposes, as described below. It is also capable of receiving input data in the PANELLINK™ format for use as the base image. Other input cards may also be used, though the hub can function in one embodiment with a system card and up to five output cards. FIG. 17, in contrast, illustrates an exemplary configuration employing a system card 110, three input cards (labelled INPUT A, INPUT B, and INPUT C), and two output cards (labelled OUTPUT A and OUTPUT B). Each of the input and output cards may process more than one data stream, also as discussed below. Communications between the system, input and output cards is via various pixel and control buses and discrete signal paths.

Pixel data is driven onto a pixel bus 114 for subsequent extraction from the pixel bus 114 by one or more output interface cards. Each output interface card then either forwards the entirety of the extracted pixel bus data to one or more interconnected video display devices, or forwards a specific portion of the pixel data to an interconnected display device. In the situation where all of the pixel bus data is forwarded to an associated video display device, that device is provided with a frame buffer for selectively extracting a portion of the entire pixel bus dataset for display.

Figure 18:
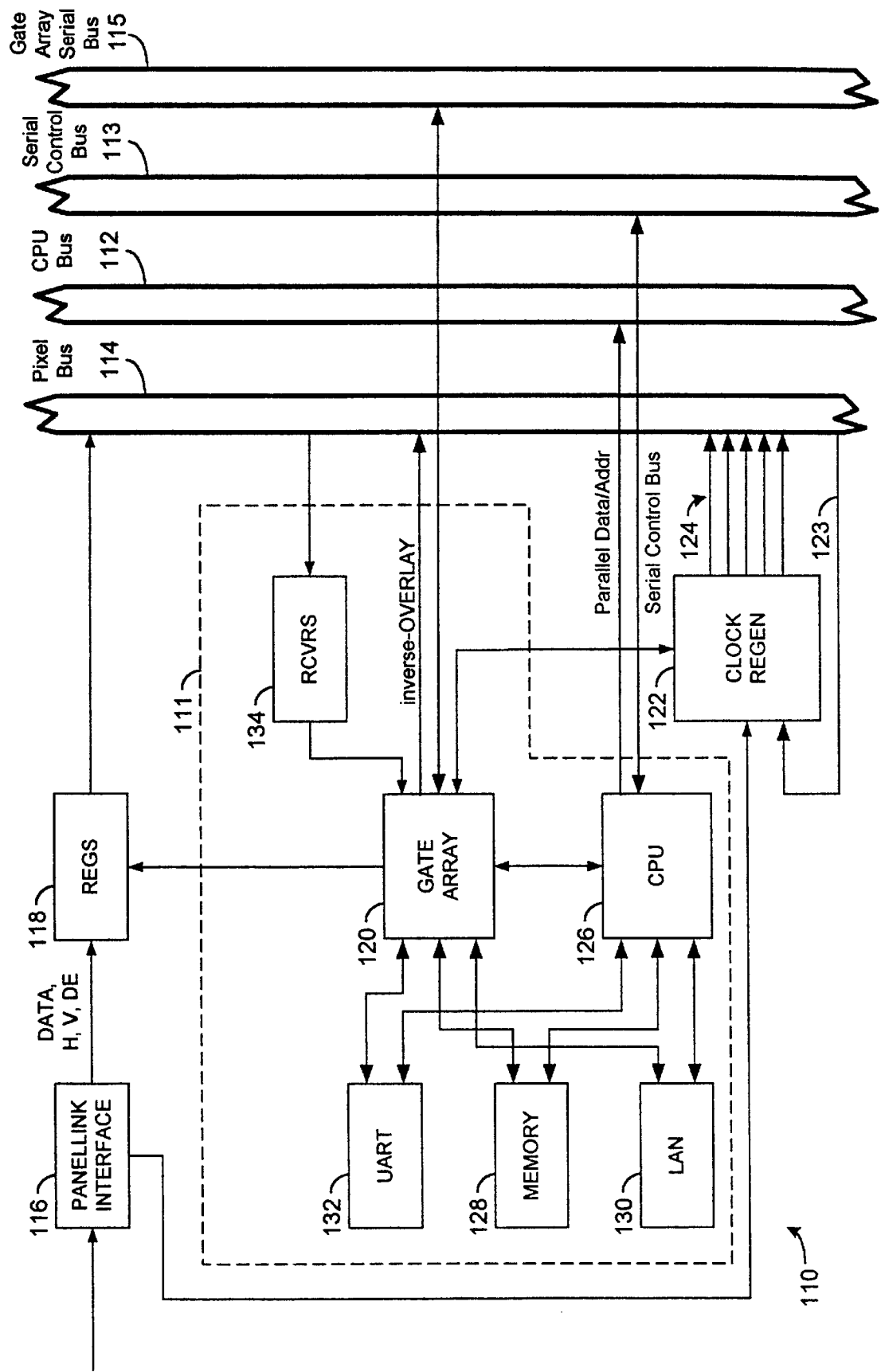
FIG. 18 is a block diagram of a system card for use in the hub of the present invention.

In a first embodiment of the presently disclosed hub, there are six card slots in a hub chassis, one of which is occupied by a system card 110, as illustrated in FIG. 18. The five remaining slots are available for interfacing to a variety of video input sources and a variety of output display devices. Other hub embodiments provide a smaller or larger number of card slots.

The hub also provides a backplane for supporting a CPU bus 112, a serial control bus 113 from a system card CPU 126, the parallel pixel bus 114, a gate array serial bus 115 and a power supply module (not shown).

The CPU bus 112 is comprised of sixteen data and eight address lines to and from the system card CPU 126, a write/read control bit for addressing gate arrays on other interface cards, and a per slot enable line for each of the hub slots.

The serial control bus 113 is comprised of a clock line and a data line from the CPU 126, and is used for writing to and reading from control registers disposed throughout the hub and for writing to and reading from registers associated with frame buffers which may be disposed in association with display devices external to the hub.

The pixel bus 114 comprises parallel data lines which are one pixel (twenty-four bits) wide, in addition to horizontal synchronization (HSYNC), vertical synchronization (VSYNC), data enable (DE), a pixel clock line for each hub slot 124, and an overlay control line (inverse-OVERLAY). The latter signal is asserted by an input interface card while it is driving an overlay signal onto the pixel bus, as described subsequently. The pixel bus 114 also supports a common pixel clock line 123 driven by the input interface card providing a base image signal in the absence of such a base image signal input to the system card 110.

A first embodiment of the power supply module (not illustrated) receives twelve volts, regulated or unregulated, and outputs 3.3 volts and 5.0 volts on the backplane. The CPU 126 is capable of determining the power requirements of the cards populating the hub, and of associated display devices which rely upon the hub for their power. The CPU 126 is also capable of selectively enabling and disabling certain electronic elements if there exists insufficient power. For instance, the CPU 126 is capable of deactivating a frame buffer of a particular interface card, an element which tends to consume more power than others, should power requirements exceed capacity.

Each hub contains a system card 110, such as shown in FIG. 18. Digital video data in PANELLINK™ format can be provided as the base image to the system card 110 via a standard PANELLINK™ interface unit 116. The output of this interface 116 is pixel data (DATA), HSYNC (H), VSYNC (V), and a data enable indication (DE), all of which are buffered in registers 118 under the control of a gate array 120. The PANELLINK™ interface 116, if receiving a PANELLINK™ video signal, also derives a pixel clock from the input signal for distribution throughout the hub via clock distribution logic 122. If the system card 110 PANELLINK™ input is to be used as the base image, the base image data will be output to the pixel bus all the time in the absence of overlay data from one of the other input interface cards disposed within the hub. Also, the gate array 120 control logic on the system card enables the registers 118 in communication with the PANELLINK™ interface 116. However, if one or more of the remaining input interface cards (discussed subsequently) is to drive overlay data onto the bus, the system card gate array 120, CPU 126 and associated circuitry (collectively comprising the CONTROL block 111 shown in FIG. 18) have previously configured those other interface cards with instructions to output the appropriate block of pixel data onto the pixel bus 114 and an indication of when, within a frame, to start this output. Accordingly, the gate array 120, in response to initiation of the inverse-OVERLAY signal by the overlay card, disables the system card pixel bus registers 118 while the overlay data is being written to the pixel bus 114 by another input card.

If the system card 110 is not receiving video input via the PANELLINK™ interface 116, or if it is, but that video input is not to be used as the base image, the clock distribution logic receives a clock 123 from one of the other input cards installed in the hub. In any case, under the switch control of the gate array 120, the clock regeneration logic 122 then provides the pixel clock signal directly to the gate array 120 of the system card 110 and to each of the remaining interface cards installed in the hub via discrete clock lines 124.

If none of the input data is designated as the base image, or in other words, when only overlay data is to be provided to the pixel bus 114, the system card gate array 120 (executing software stored in associated memory 128) selects one of the overlay input signals from one of the other input cards as a source of pixel clock and sync signals. The choice of which is used for this purpose may be made based upon pixel clock speed, card slot position, or some other factor.

In one embodiment of the system card 110, a local area network (LAN) interface 130 provided in association with the gate array 120 of the system card control block 111 provides an interface for a serial control line input, such as a 10BaseT interface. This input is utilized to program the memory 128 utilized by the gate array 120 and the CPU 126 in configuring the interface cards of the hub. For instance, it is through this path that overlay windows are defined in the hub. The interfaced computer relays to the hub that a window is to be established at certain screen coordinates; the hub then configures the appropriate input overlay card to begin driving pixel data onto the pixel bus at the appropriate time such that the window defined by the computer is provided.

The memory 128 itself is preferably comprised of a combination of a high-speed flash memory and a RAM scratch pad area. The flash memory portion is utilized for parameter storage, which is the hub configuration and source characterization information, and a non-volatile code space is provided for the CPU 126.

The system card control block 111 further comprises a universal asynchronous receiver/transmitter (UART) 132, also for the purpose of providing a serial port interface to the control block 111. In another embodiment, the UART 132 is replaced with a universal serial bus (USB) interface, which has the capability of providing extra ports, should the need arise, through the use of an expander. Either serial interface enables the same type of overlay control exercised using the LAN interface, as previously described.

One of the functions which the control block 111 performs is to analyze the received HSYNC and VSYNC from a video input, received by any of the input interface cards, for the purpose of identifying the source of the video signal. These signals are provided to the gate array 120 via receivers 134 in communication with the pixel bus 114. For instance, different video sources use three common video sync protocols, as previously described. Such source identification information is useful in determining how large a frame the source can provide. The source information is also utilized when the system card gate array 20 is programming the new base image card.

Figure 19:
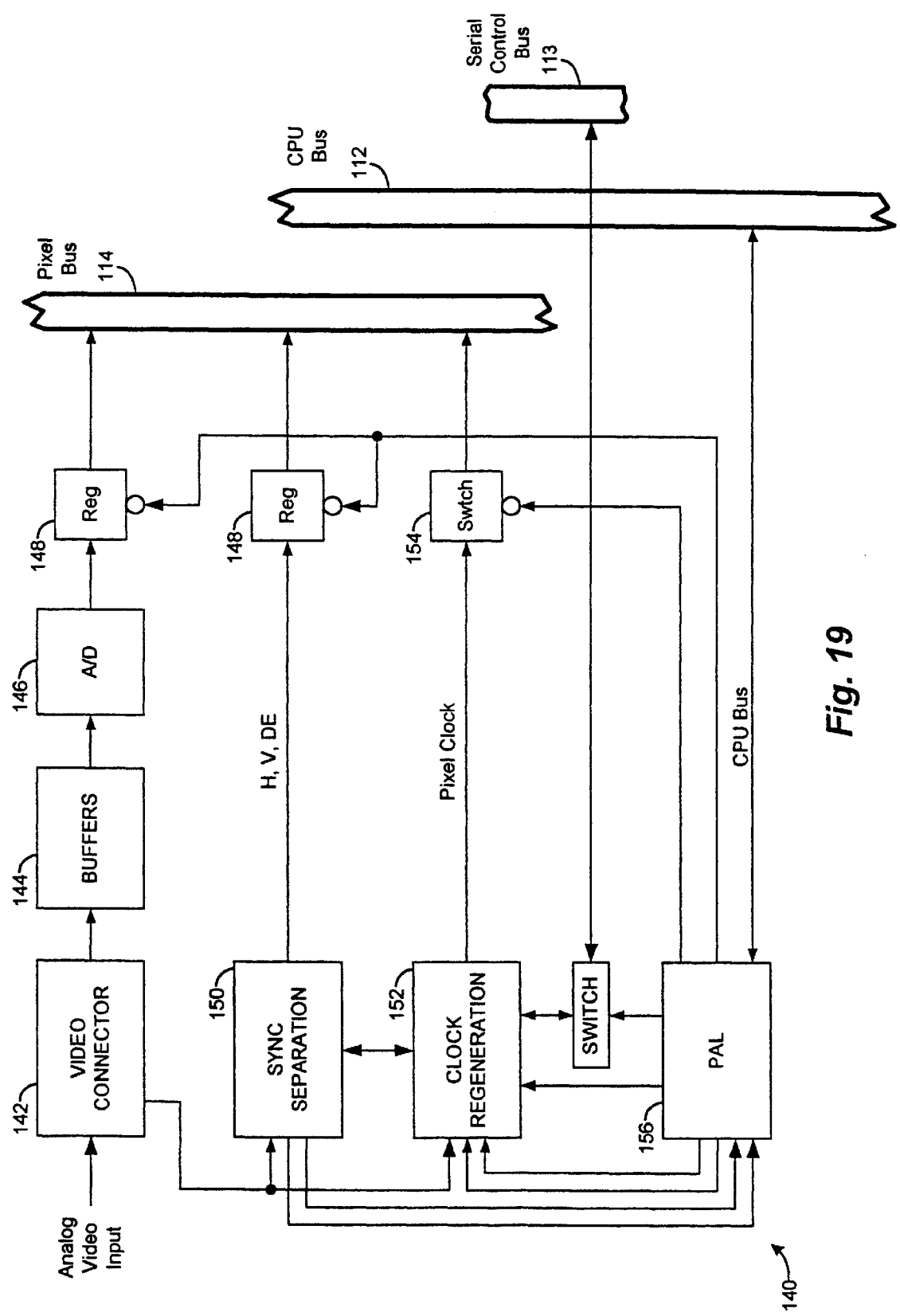
FIG. 19 is a block diagram of an analog input card for use in the hub of the present invention.

Other forms of input interface cards will now be described. In FIG. 19, an analog input card 140 is illustrated. A standard video connector 142 is provided to interface the hub to the source of analog video data, such as the RGB output from a standard personal computer graphics adapter card. From the connector 142, the received data is buffered by an analog buffer 144 prior to being passed through an analog-to-digital converter 146, such as that illustrated in the A/D circuit block 24 of the video distribution hub, above. As with the system card 110, registers 148, under local control, are utilized to gate the digitized video data onto the pixel bus. The data will be driven onto the pixel bus 114 when this analog input card is the base image card, and the base image is not being overlaid.

The video connector 142 also provides an input to a sync separation block 150 for the purpose of identifying the input data format and isolating the HSYNC and VSYNC from the analog input signal. These sync signals are also gated to the pixel bus 114 via registers 148 for source identification by the system card 110.

In addition, the video connector output is driven to a clock regeneration unit 152 for the purpose of extracting a pixel clock from the received data in the case when the analog input signal is utilized in the hub as the base image or default source of reference timing. Whether the locally recovered pixel clock is provided to the remainder of the hub interface cards is controlled by a switch 154, which is in turn controlled by local control logic 156.

In the illustrated embodiment, this local control logic 156 is implemented in a programmable array logic (PAL) unit, which includes one or more register interfaces controlled by the CPU bus 112. Other embodiments utilize specialized registers for this purpose. The control logic 156, programmed by the system card 110 CPU 126 via the CPU bus 112, performs the simple control functions related to enabling pixel data output to the pixel bus, outputting the locally recovered HSYNC, VSYNC and DE onto the pixel bus, and forwarding the locally recovered pixel clock to the system card clock regeneration unit 122.

Figure 20:
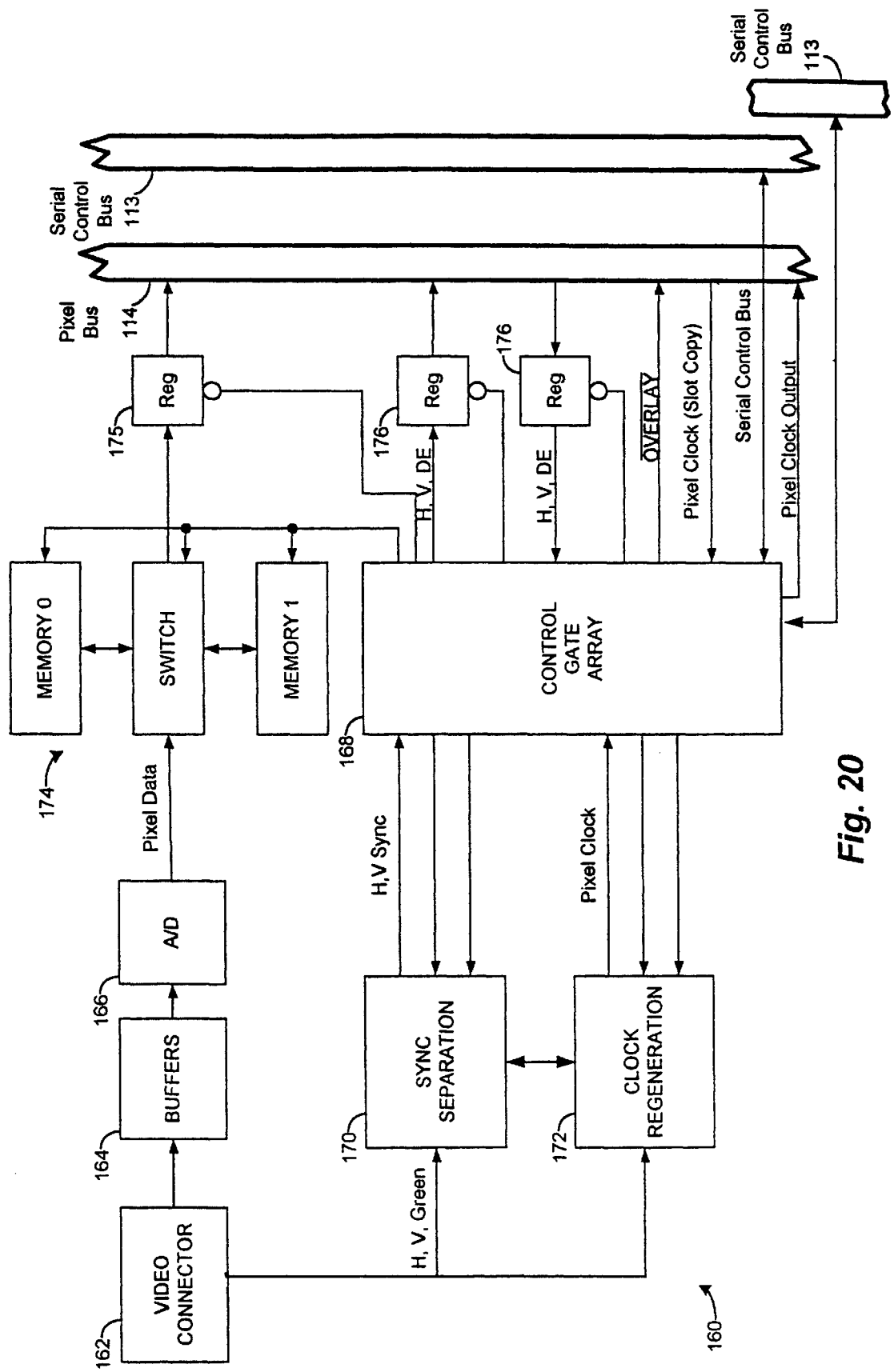
FIG. 20 is a block diagram of a computer overlay input card for use in the hub of the present invention.

Another input interface card which can be employed in the hub is a computer overlay input card 160, as shown in FIG. 20. In many respects, this card resembles the analog input card 140 of FIG. 19. At an upper level, both employ a video connector 142, 162 as an interface to an analog input signal. Both buffer the received video data with a buffer element 144, 164, and both send the received analog data through an analog-to-digital converter 146, 166. However, the computer overlay input card 160 also employs a control gate array 168 and associated sync separation block 170 and a clock regeneration unit 172 which, while analogous to the local control logic 156 and associated elements of the analog input card 140 from a macroscopic view, actually provide a more complex level of control over the received analog video data. This heightened level of control is necessary in order to control the output of at least a portion of the received analog video data onto the pixel bus as an overlay, as described below.

Another difference between the analog input card 140 and the computer overlay input card 160 lies in the memory utilized for storing the digitally-converted data prior to making it available to the pixel bus 114. The memory in the computer overlay input card 160, in a first embodiment, is a frame buffer implemented with a form of "ping pang" memory 174, comprised of two memory banks identified as MEMORY 0 and MEMORY 1 in FIG. 20, where data coming into and out of the memory 174 passes through a central data switch labelled SWITCH. In order to expedite access time, pixel data being written into the memory 174 goes into one of the memory banks, while pixel data being read out from the memory 174 is read from the other one of the memory banks. The switch changes memory banks at each received or transmitted frame.

The control logic for the computer overlay input card employs a control gate array 168 in a first embodiment which acts as a microsequencer. Thus, the memory switch is under the control of the gate array, as is the sync separation block 170 and the clock regeneration unit 172, whose outputs are used in order to time the writing to the memory banks. The control gate array 168 indicates to the sync separation block 170 and the clock regeneration unit 172 what format the received data is in for the purpose of recovering the syncs, DE and pixel clock. This data is then made available to the system card, including line count and frame time, for software source recognition.

Received analog video data is selectively buffered in the memory banks of the memory 174, and is gated to the pixel bus 114 by registers 175. Both operations are under the control of the control gate array 168. The gate array 168 is programmed by the system card 110 via the serial control bus to identify a starting point and an offset within the buffered data for when the overlay data is to commence. The serial control bus from the system card is also used to program the computer overlay input card to specify the portion of overlay data stored in the frame buffer 174 that is to be output to the pixel bus 114, and the point within the pixel bus frame data that the overlay data output is to commence. When the overlay commences, the gate array asserts the inverse-OVERLAY signal. This signal alerts the input card generating the base image that the overlay card is writing data to the pixel bus, and that the base image card should shut off the registers gating the base image to the pixel bus.

In alternative embodiments applicable to all overlay cards presently disclosed, the instructions from the system card to the input overlay card as to what portion of the buffered overlay data is to be written onto the pixel bus at the appropriate time takes a variety of forms. For instance, overlaid data can be merged into the base image on the pixel bus 114 on a pixel-by-pixel basis, or according to various algorithms pre-programmed into the local control gate array.

As with the analog input card 140, the computer overlay input card 160 employs registers 176 for the purpose of either reading in or writing out HSYNC, VSYNC and DE. The gate array receives the slot copy of the pixel clock from the system card 110, or in the case when this computer overlay input card is the base image card, drives to the system card the pixel clock recovered by the clock regeneration block 172 for redistribution to the other interface cards. The received pixel clock is required in order to synchronize the output of pixel data onto the pixel bus.

In one embodiment of the presently disclosed hub, there is one channel available for receiving an analog overlay signal on the computer overlay input card. However, other embodiments, which employ more densely packed circuits or which employ larger circuit cards, or both, provide plural channels.

Figure 21:
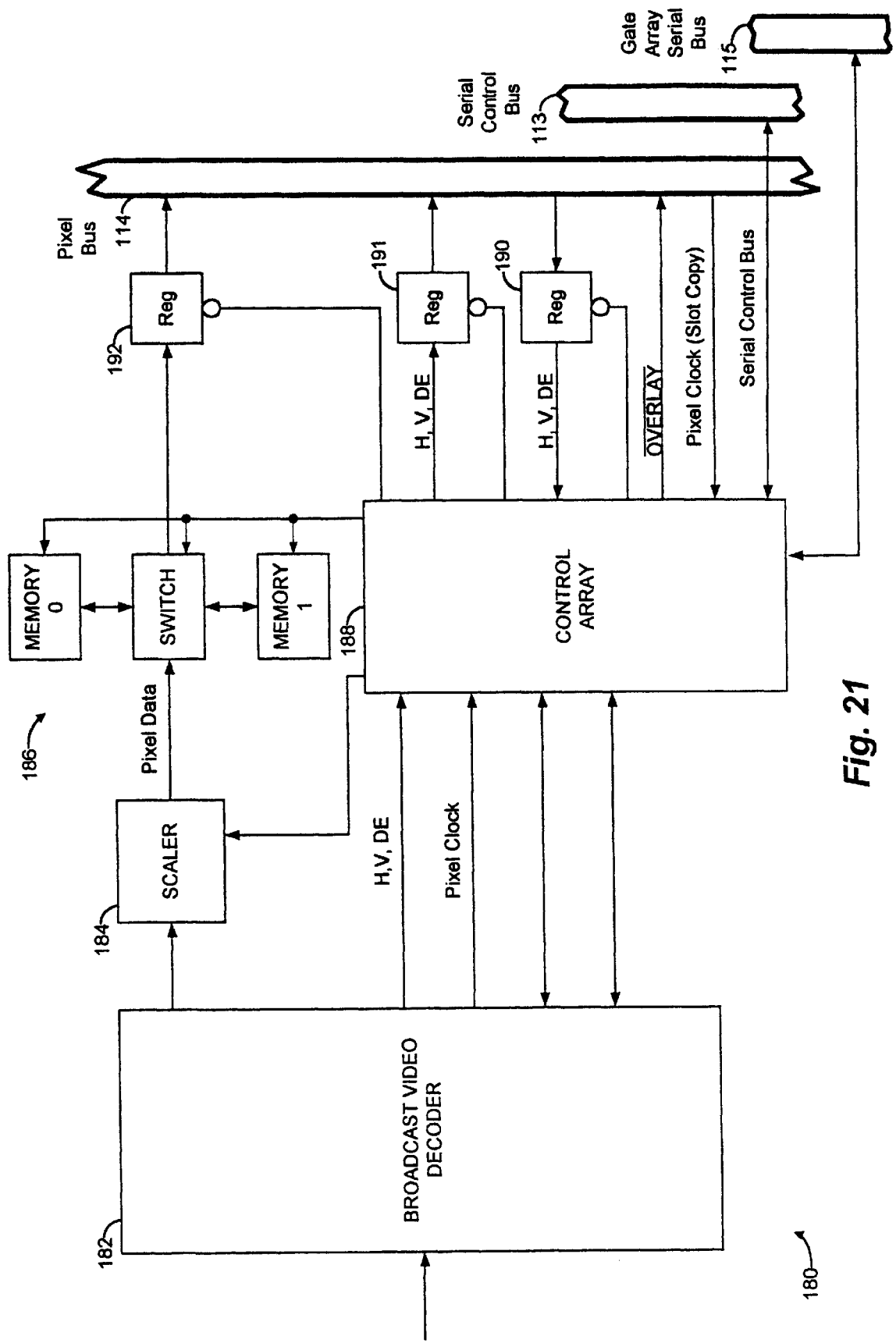
FIG. 21 is a block diagram of a broadcast video input card for use in the hub of the present invention.

Another input card which may be utilized in the presently disclosed hub, depending upon the needs of the hub user, is a broadcast video (BVIDEO) overlay card 180, as shown in block form in FIG. 21. This card is utilized to receive broadcast video data, in one of many formats, to buffer the data in an on-board memory, and to selectively output the buffered video data onto the pixel bus.

A comparison of FIG. 21 and FIG. 20 reveals that the BVIDEO overlay card 180 resembles the computer input overlay card 160 in many respects. Each has an input interface specific to the expected data. Each has a buffer memory for selectively storing the received pixel data, and for enabling the writing of selected portions of that data onto the pixel bus. Further, each has control logic for controlling these functions.

With regard to FIG. 21, the BVIDEO overlay card 180 uses a broadcast video decoder 182 appropriate for the format of the received video data, which can be in NTSC, PAL, or any other video format. This decoder provides the video data in digital form to a scaler 184 in a first embodiment. This scaler selectively reduces the digital pixel dataset, to a degree specified by a user in view of memory capacity and speed, and required resolution at the display device. The output of the scaler in this embodiment is then fed to the memory 186, which is also a "ping pong" memory in a preferred embodiment, as described with respect to the computer overlay input card of FIG. 20.

In alternative embodiments of the BVIDEO overlay card of FIG. 21, the scaler 184 is utilized at the output of the buffer memory 186, in order to reduce the resolution of a segment of data to be displayed such that a larger overall picture fits into a smaller overlay window. Thus, the scaling performed by the scaler 184 will depend upon the resolution desired in the overlaid window. The scaler is therefore programmable by the associated control gate array 188, whether the scaler is before the memory 186 or after. In yet a further embodiment of the present invention, no scaler is utilized.

In most respects, the function of the control gate array 188 for the BVIDEO overlay card 180 is the same as that handled by the control gate array 168 of the computer input overlay card 160. The control gate array 188 is responsible for receiving overlay location information and buffer segment to be displayed information from the system card 110 via the serial control lines, for receiving the slot copy of the pixel clock from the system card 110, for receiving the HYSNC, VSYNC, and DE signals from the system card via registers 190 which it controls, for controlling the function of the ping pong memory switch, and for controlling the registers 192 which gate the pixel data out of the memory 186 onto the pixel bus 114. In addition, the control gate array 188 receives HSYNC, VSYNC, DE and the pixel clock from the broadcast video decoder 182 for enabling source identification carried out by the system card 110. When specified by the System Card, the gate array within the BVIDEO overlay card drives recovered HSYNC, VSYNC and DE signals onto the Pixel Bus 114 via registers 191. Note the distinction between this card 180 and the computer input overlay card 160 - there is no discrete sync separation block or clock separation unit, since those functions are implemented in the broadcast video decoder. The video decoder 182 is configured for the received video data format by the control gate array, via the serial control buses.

In a preferred embodiment of the presently disclosed video hub, there are two BVIDEO overlay circuits, such as that shown in FIG. 21, on a single circuit card. Each such circuit employs the elements shown in FIG. 21. Alternative embodiments provide only a single overlay circuit per circuit card, or more than two such circuits per card, depending upon card size and circuit density.

Figure 22:
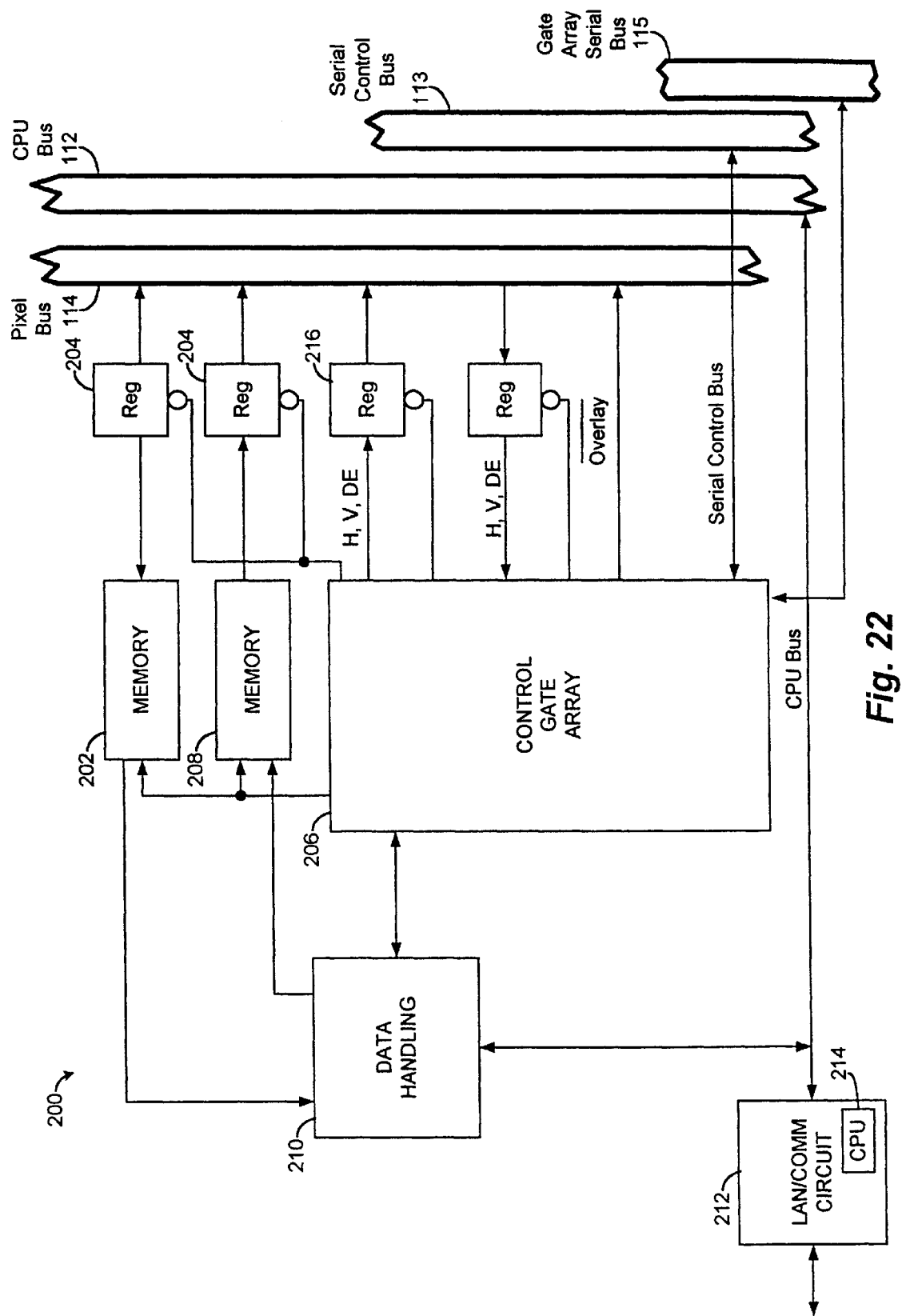
FIG. 22 is a block diagram of a data exchange card for use in the hub of the present invention.

Another interface card employed in the presently disclosed hub is referred to as a data exchange module 200, shown in FIG. 22. This module enables a user to provide all or a part of the pixel bus data to an interconnected device such as a personal computer or another hub. A first memory element 202, gated by registers 204 under the control of a local control gate array 206, provides temporary storage for the desired pixel data prior to being forwarded off board. The system card 110, and the CPU 126 in particular, is responsible for programming the control gate array 206 of the data exchange module 200 to specify the portion of the pixel data which is desired.

The data so extracted can also be provided as an input to another hub as presently disclosed. The extracted data would therefore include any and all overlay data found in the pixel data of the local pixel bus 114. A subsequent hub, receiving such pixel data as an input, would then be configurable such that further overlaid windows could be merged into the pixel data.

The data out of the data exchange module 200 can also be used as an input to a display device, if properly buffered and formatted, such as via a PANELLINK™ interface or any other suitable interface.

A further feature of the data exchange module 200 is the ability to receive pixel data from another source, such as from a corresponding data exchange module in another hub. Such received data is buffered in a second memory element 208, from which all or a selected portion of the received pixel data can be output onto the pixel bus, under the control of the control gate array 206 as programmed by the system card 110 and using the inverse-OVERLAY signal protocols as discussed above, for instance with respect to the computer input overlay card 160.

Intermediate the two memory elements 202, 208 and the external device in communication with the data exchange module 200 is a data handling element 210, which is required in order to transfer data from the synchronous memory elements 202, 210 to an asynchronous bus in communication with the external device. The data handling unit 210 is therefore necessary to reformat the pixel data into the desired output format, and its implementation is specified by the equipment to be interfaced to. For instance, the output of the data handling unit 210 can be video, digital or RF in various embodiments.

The actual interface between the data exchange module 200 and an interconnected device in one embodiment is a LAN/communications (LAN/COMM) circuit 212, having an associated CPU 214. This interface can be configured for interfacing the respective hub to a 100BaseT data path for live video output/input, or to a 10BaseT data path for sending or receiving "snapshots", or discrete frame samples of pixel data.

Pixel data captured from the local pixel bus 114 can also be routed to the LAN used for configuring the respective hub. The desired data is transmitted over the system card CPU bus, which is extended across the hub backplane. From the system card, the data is then routed via the CPU-associated LAN interface 130 to the control LAN.

The control gate array 206 for the data exchange module 200 is also responsible for receiving, or transmitting, HSYNC, VSYNC, and DE via registers 216. As with other, previously described gate arrays, the gate array of the data exchange module 200 also sets the inverse-OVERLAY signal when data which it has received from an external source is being used as an overlay input to the pixel bus 114. The definition of the overlay from among the received data, the selection of the portion of the overlay data for output to the pixel bus 114, and the timing of the output of that selected data, is also under the control of the gate array 206, as programmed by the system card via the serial control buses.

A further form of input interface card which is not illustrated includes an interface responsive to serial commands for the generation of graphical images. For instance, certain operating system overlays such as X-Windows communicate graphics commands rather than the images themselves. Thus, this interface generates graphics data in response to the received serial commands. These graphics data are then buffered in a frame buffer such as that illustrated with respect to the BVIDEO overlay card.

Figure 23:
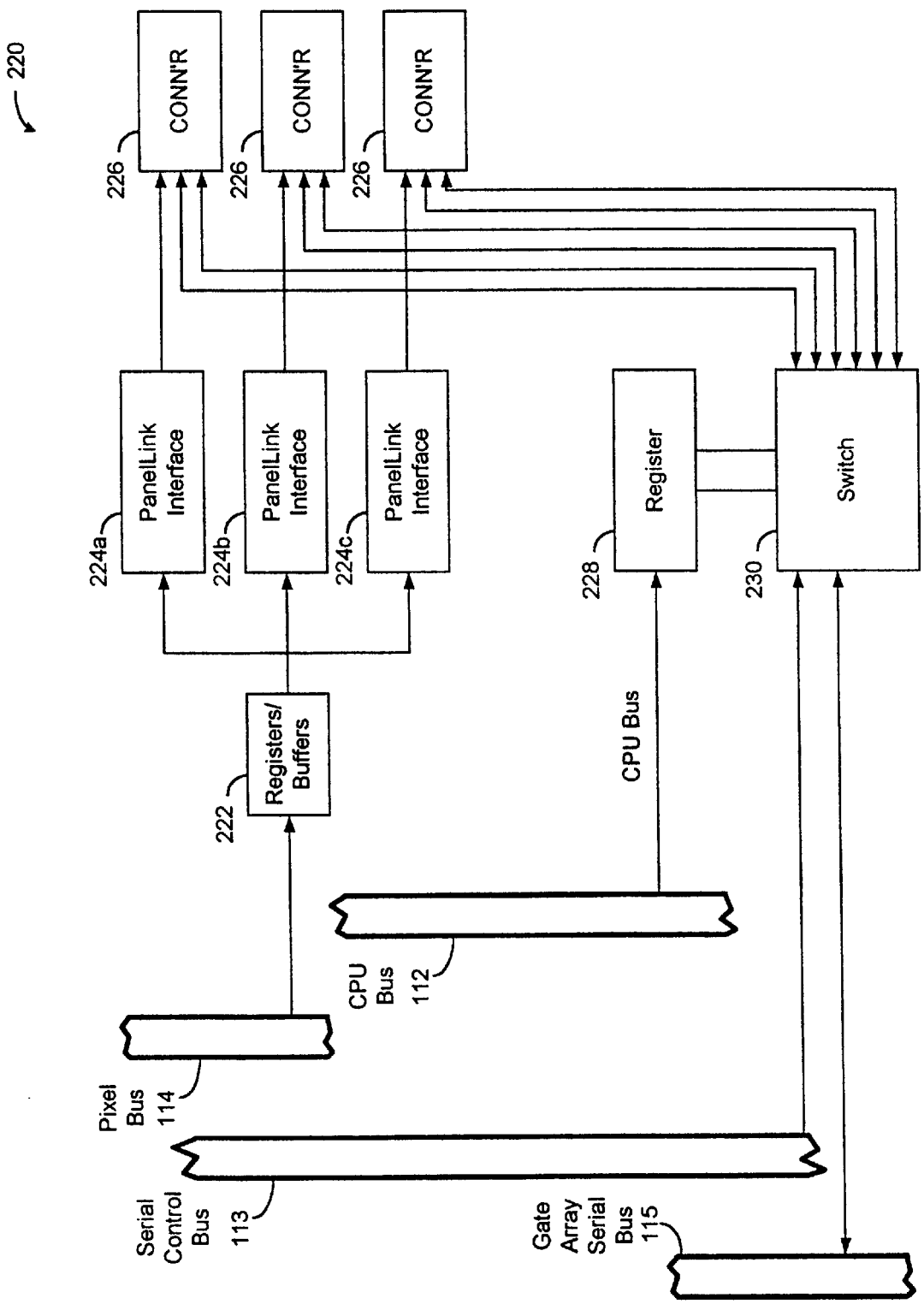
FIG. 23 is a block diagram of a PANELLINK™ output card for use in the hub of the present invention.

Having discussed a variety of input interface cards which can be used to configure the presently disclosed hub, output interface cards will now be reviewed. A first form of output interface is illustrated in FIG. 23, and is referred to as a triple PANELLINK™ output card 220. Data from the pixel bus 114, including pixel data, HSYNC, VSYNC, and DE, is captured in a temporary storage element 222, which depending upon the embodiment can be either registers or a memory buffer. The data stored in the storage element 222 is then available to the three PANELLINK™ interfaces 224a, 224b, 224c.

Each PANELLINK™ interface 224 in the triple PANELLINK™ output card 220 provides the pixel bus data in PANELLINK™ format along with the sync, data enable, and clock signals. This output is provided to an interconnected display device via a cable which in a first embodiment also provides power to the display device. Connectors 226 adapted for interfacing to such custom cables are provided.

Each display device connected to the triple PANEL-LINK™ output card 220 has associated therewith a frame buffer for the purpose of storing only the portion of the pixel bus data which is desired for display on the display device. The frame buffer then outputs the desired data for synchronization with a display clock. The data is then made available for display. The triple PANELLINK™ output card 220 also provides a serial control bus 113 link to each interconnected display device for the purpose of programming the display device frame buffer, according to the input provided to the system card 110 by the external control system, with the portion of the pixel data which is to be displayed. Depending upon the implementation, this data can be in the format of start and stop signals, or a starting point with an offset to a stopping point, or some other set of controls which identify to the frame buffer what portion of the pixel bus data, via the PANELLINK™ interface, is to be buffered and displayed.

A register 228 is coupled to the CPU bus 112. The register 228 is used to control a switch 230 which enables the coupling of the serial control bus 113 and the gat array serial bus 115 to the interconnected display device frame buffers. Since the runs between the hub and each the display devices can be quite long, it would be impractical to try to drive the serial bus to each frame buffer all the time. Further, addressing is not provided at each frame buffer, so there would be no way for a particular frame buffer to distinguish between control signals intended for various frame buffers. The switch 230 is thus used for selectively routing the serial bus to the appropriate remote frame buffer.

In alternative embodiments of the present hub, the triple PANELLINK™ output card 220 can be provided with one, two or four or more PANELLINK™ output channels, depending upon space available on the circuit card and the needs of the user.

Figure 24:
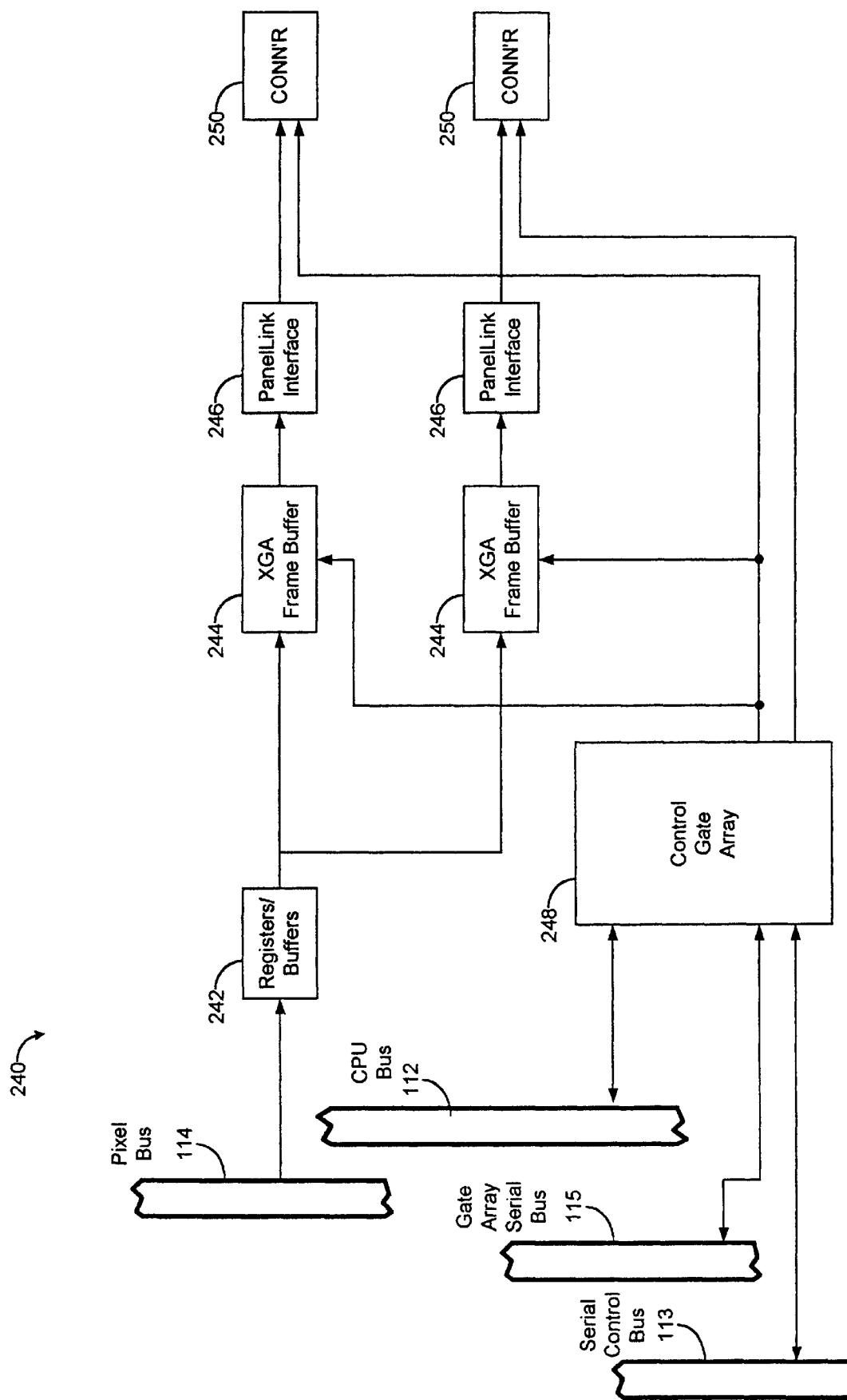
FIG. 24 is a block diagram of a DFP output card for use in the hub of the present invention.

Another embodiment of an output interface card for the hub is illustrated in FIG. 24. This card is the dual DFP output card 240, which is similar in some respects to the triple PANELLINK™ output card 220, with the exception that the output of the presently described card is compliant with the DFP standard, and the card includes the frame buffer function on-board, instead of located at the display device as with the display device associated with the triple PANEL-LINK™ output card 220 of FIG. 23.

In the dual DFP output card 240, pixel data from the pixel bus 114 is received in temporary storage elements 242, which can be registers or any other suitable memory element. From there, the buffered data is passed to respective frame buffers 244 which each employ a ping pong memory such as that described in conjunction with the computer overlay input card 160 or the BVIDEO overlay input card 180. This memory enables the selective writing of pixel data to the dual memory banks, and the reading of stored data at the appropriate time, all under the control of a control gate array 248, programmed by the system card CPU 126 via the CPU bus 112 and the serial control bus 113. In the illustrated embodiment, the frame buffers 244 are XGA frame buffers, meaning that each has the capacity to buffer enough data from among the entire pixel bus dataset to drive an associated XGA video display device.

The output of each frame buffer 244 is provided to a PANELLINK™ interface 246 for the purpose of sending properly formatted video data to the respective display device. Alternatively, the output of one channel of such a dual DFP output card 240 can be used as a PANELLINK™ input to, for instance, a system card 110 of another hub, or as an overlay input to another hub. The PANELLINK™ interface 246 output is provided to a standard PANEL-LINK™ cable connector 250. In addition, this output interface card 240 provides an extension of the gate array serial bus 115 which is used, depending upon whether the video display device is DDC compliant, for the purpose of collecting data from the display device including technical specifications such as refresh rate of the attached display device, backlight operating time, power conditions, and temperature conditions.

In further embodiments of the presently disclosed hub, one or three or more video display channels are provided, depending upon the availability of circuit card space and the needs of the user.

Figure 25:
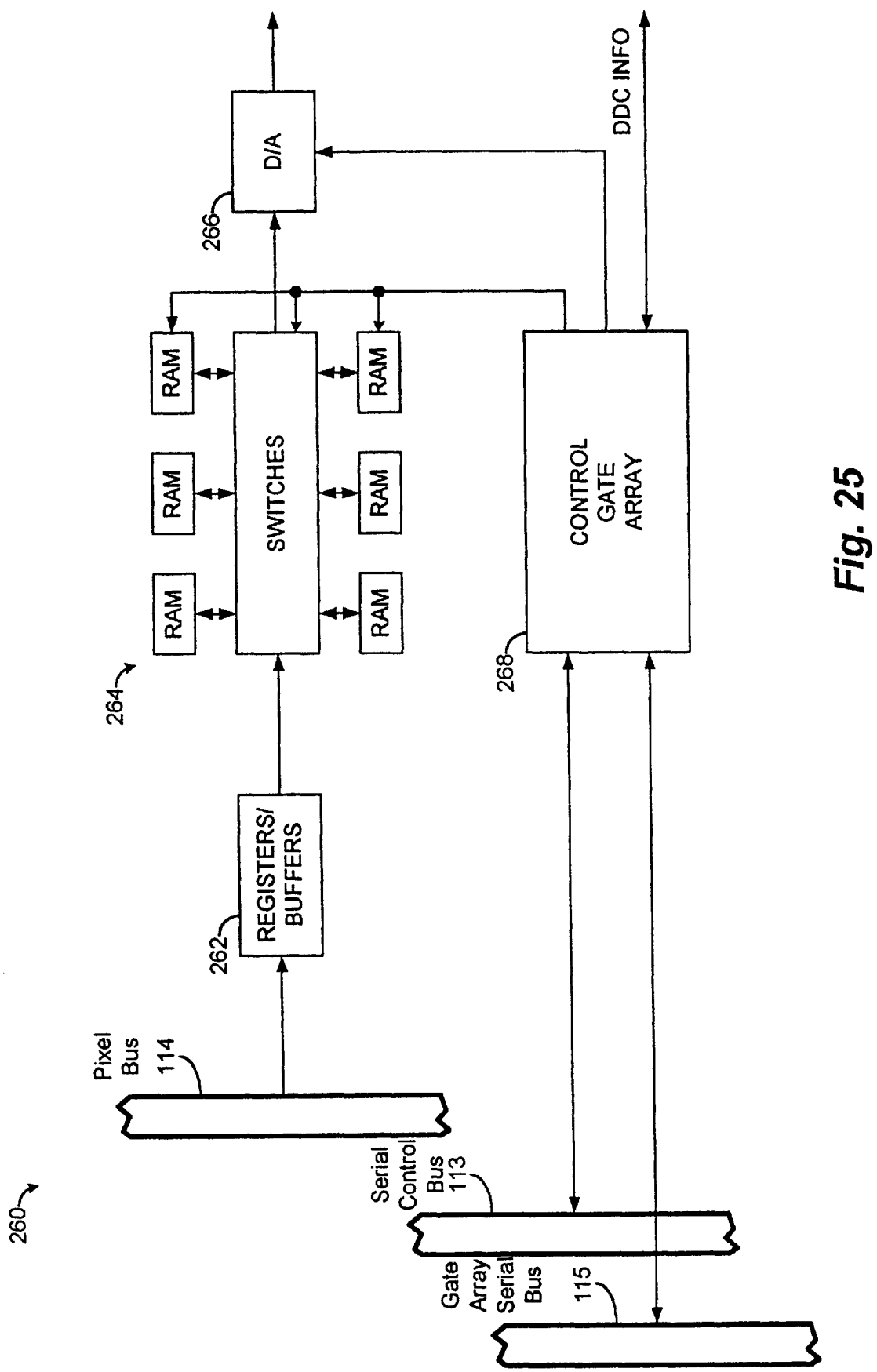
FIG. 25 is a block diagram of a CRT output card for use in the hub of the present invention.

A further output interface card employable in the hub of the present invention is a CRT output card 260, as depicted in FIG. 25. This card also receives pixel bus data in temporary storage 262 such as registers or memory buffers. From there, the received pixel data is sent to memory 264. As illustrated, one embodiment of the memory 264 employs plural ping pong memories and a switch responding to an associated gate array 268 in order to improve memory bandwidth. The gate array is programmed by the system card CPU 126 via the serial control bus 113.

The output of the memories 264 passes through a digital to analog (D/A) converter 266 and is provided to the associated CRT display device via an appropriate connector (not shown). In one embodiment in which the CRT display device provides maintenance or configuration information via a standard bus such as DDC, the gate array serial bus 115 from the gate array 120 of the system card 110 is extended to the associated display for gathering such information.

One problem with utilizing PANELLINK™ outputs, as with the triple PANELLINK™ output card 220 or the dual DFP output card 240, is that PANELLINK™ cable runs are typically limited to approximately fifteen feet, whereas it may be desirable to have the hub substantially removed from the display devices interfaced thereto. One embodiment therefore employs D/A converters for driving the desired video data up to and including the entire video space over distances on the order of 100 feet. Further, the output of the D/A converter can be passed through a compensation amplifier in the case of longer cable runs.

In yet another embodiment, the output of the D/A converter as previously described, or of the compensation amplifier, is provided at a standardized connector, such as a Universal Twisted Pair (UTP) connector. Such a connector can be further utilized to convey other input information, such as from a keyboard, mouse, or similar serial interface device back to an external control system. This connection can also be utilized to convey serial bus traffic via an encoder in addition to the pixel data.

Similarly, cable length limitations can be compensated for on the input side of the hub through, for instance, the provision of a UTP cable connector at the input to the analog input card 140. Such a further embodiment of the analog input card 140 provides, in addition to the UTP connector, an optional compensation filter at the input to the A/D front end circuitry. This UTP connector would then be available for receiving other communications, such as the encoded serial data from a keyboard, mouse or similar device, or serial bus traffic via a decoder.

A problem with some analog communications paths lies in the use of conductor pairs for discrete portions of the total signal, resulting in unsynchronized data at the receiver. For instance, in one embodiment, an asynchronous bus is comprised of twisted pair conductors for each of red, green and blue data paths. These individual data lines must be resynchronized in order to compensate for delays introduced as a result of unequal conductor lengths. This can be accomplished by phase fine tuning the discrete, unsynchronized portions of the total data, then hard clocking the data out of the A/D front end of a variant of the analog input card 140.

A display device which is interfaced to the presently disclosed hub can have a frame buffer local thereto, or can be provided with that function through a frame buffer local to the respective output card. For instance, a display device to be driven by the triple PANELLINK™ output card 220 of FIG. 23 has its own frame buffer circuit. This is preferable in one sense in that the frame buffer size can be customized to the actual display capabilities of the respective display device. With respect to the dual DFP output card of FIG. 24, the frame buffers local to the output interface card must be made as large as the largest frame which can be displayed by a display to be connected thereto. However, the necessarily large capacity of that frame buffer may go under-utilized.

Figure 26:
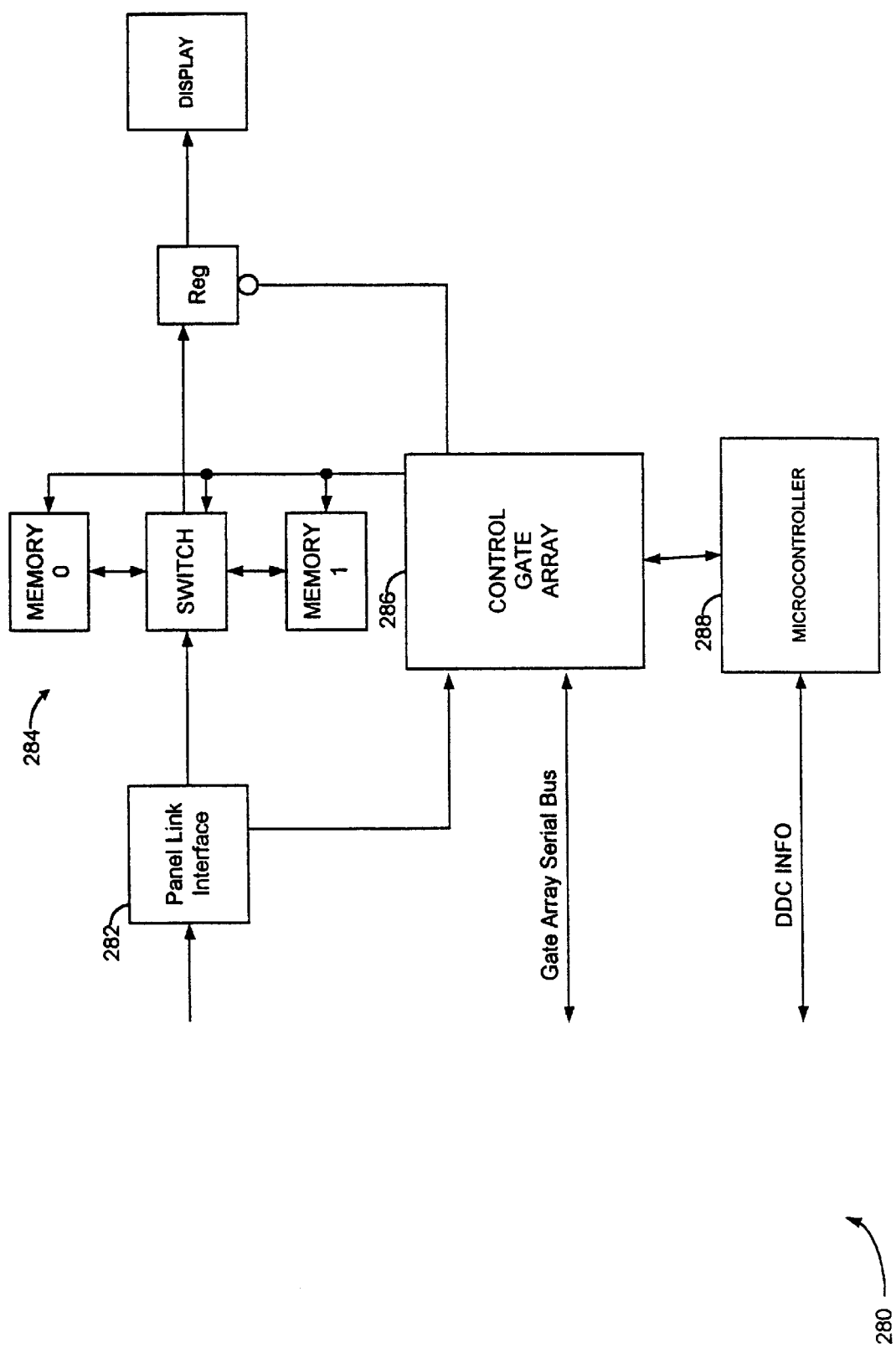
FIG. 26 is a block diagram of a video display device for use in association with the hub of the present invention.

A display device 280 (also referred to as a "tile") having a local frame buffer and adapted for being driven by one channel of the triple PANELLINK™ output card 220 is illustrated in FIG. 26. A PANELLINK™ input interface 282 receives the pixel data from the associated PANELLINK™ output card 220, and provides it to a frame buffer, such as the ping pong memory arrangement 284 as shown. As with the overlay input cards described above, the frame buffer 284 is under the control of a control gate array 286 having a link to the system card 110 via the extended serial control bus 113. The control gate array 286 is also in communication with a microcontroller 288 local to the display device 280, which is in communication with the extended gate array serial bus 115 from the gate array 120 of the system card 110 for the purpose of managing the power state of the display device, and for tracking and reporting display run time and temperature to the system card 110.

Certain protective features can also be implemented in some of the output interface cards. For instance, the output of the triple PANELLINK™ output card 220 includes 12.0 volts for the purpose of powering the associated display device. A standard PANELLINK™ display element, which is not expecting power in association with the PANELLINK™ data, could be damaged if so connected. Therefore, a further embodiment of the present hub provides a switching capability for output interface cards, under the centralized control of the system card 110.

In a further embodiment, an adapter is provided for receiving a standard PANELLINK™ output and for receiving a source of power necessary for operation of a display device. The output of this adapter is then provided over a single cable, such as the cable connected to the triple PANELLINK™ output interface card 220, to a display device which relies upon a power input via the display data cable.

Modifications and substitutions to the present invention made by one of ordinary skill in the art is considered to be within the scope of the present invention, which is not to be limited except by the claims which follow.

What is claimed is:

1. A video distribution hub, comprising:
   plural video output ports to communicate with plural video display devices;
   a video display data bus;
   a base image processor for selectively providing base image data to said video display data bus, said base image data comprising more data than that which is displayable at one time by at least one video display device attachable to a corresponding one of said output ports;
   an overlay image processor for selectively merging overlay image data into said base image data on said video display data bus;
   an output interface for selectively receiving data from said video display data bus as plural video output signals on corresponding ones of the plural video output ports, said received data comprising said selectively provided base image data merged with said selectively provided overlay image data, and said plural video output signals each comprising data which is displayable at one time by at least one video display device attachable to a corresponding one of said output ports.

2. The hub of claim 1, wherein said base image processor further comprises a first input interface for receiving first external data and for selectively providing at least a portion of said first external data to said video data bus as said base image data.

3. The hub of claim 2, wherein said overlay image processor further comprises a second input interface for receiving second external data and for selectively providing at least a portion of said second external data to said video data bus as said overlay image data.

4. The hub of claim 1, further comprising a controller in communication with said base image processor and said overlay image processor for coordinating said selective provision of said base image data and said selective merging of said overlay image data.

5. The hub of claim 4, wherein said controller further comprises a clock redistribution unit for receiving a timing signal from said base image processor and for redistributing said timing signal throughout said hub.

6. The hub of claim 5, wherein said clock redistribution unit further comprises a clock selection unit for deriving a timing signal from said overlay image data and for redistributing said timing signal throughout said hub in the absence of a timing signal from said base image processor.

7. The hub of claim 1, wherein said base image processor further comprises a default base image unit for generating a predefined output signal as said base image data.

8. A video distribution hub, comprising:
   plural video outputs to communicate with plural video display devices;
   a video data bus for serially conveying video data units;
   a first video data source input interface for sourcing a first video data signal and for selectively providing at least a portion of said first data signal to said video data bus as one or more data units, said first data signal comprising more data than that which is displayable at one time by at least one of said video display devices;
   a second video data source input interface for receiving an external second data signal and for selectively providing at least a portion of said second data signal to said video data bus as one or more data units; and
   a controller in communication with said first and second video data circuits, said video data bus, and said plural video outputs to transfer said portions of first and second data signals from said video data bus to said plural video outputs such that data on each video output is displayable at one time by at least one of said video display devices.

9. The hub of claim 8, wherein said first data signal is an analog signal.

10. The hub of claim 9, wherein the said analog signal is an RGB signal generated by a computer graphics adapter.

11. The hub of claim 8, wherein said first data signal is a digital signal.

12. The hub of claim 11, wherein said data signal comprises a series of graphics commands for commanding said first video data source to generate said first data signal.

13. The hub of claim 11, wherein said digital signal is comprises of video data bus traffic from another video distribution hub.

14. The hub of claim 8, wherein said external second data signal is an analog signal.

15. The hub of claim 14, wherein said analog signal is selected from the group consisting of an RGB signal generated by a computer graphics adapter and a broadcast video signal.

16. The hub of claim 8, wherein said external second data signal is a digital signal.

17. The hub of claim 16, wherein said digital signal is selected from the group consisting of video data bus traffic from another video distribution hub and a series of graphics commands for commanding said second video data source to generate said second data signal.

18. The hub of claim 8, wherein said controller further comprises an overlay controller for defining in said second video data source which portion of said external second data signal is to be provided to said video data bus as a video overlay.

19. The hub of claim 18, wherein said first video data source is adapted for recognizing which portion of said external second data signal is to be provided to said video data bus as a video overlay and for adjusting said selective provision of said first data signal to said video data signal accordingly.

20. The hub of claim 8, wherein said first video data source further comprises a base image buffer for storing a selected portion of said first data signal, said first video data source providing at least a portion of said first data signal from said selected portion of said first data signal within said base image buffer to said video data bus.

21. The hub of claim 20, wherein said first video data source is adapted to provide clock and synchronization signals from said first data signal to said controller, and wherein said controller is adapted to configure the selective storing of said first data signal in said base image buffer of said first video data source according to said clock and synchronization signals.

22. The hub of claim 8, wherein said second video data source further comprises an overlay buffer for storing a selected portion of said external second data signal, said second video data source providing at least a portion of said second data signal from said selected portion of said external second data signal within said overlay buffer to said video data bus.

23. The hub of claim 22, wherein said data units provided by said second video data source to said video data bus from said overlay buffer were not consecutive data units in said external second data signal.

24. The hub of claim 8, wherein said controller further comprising a display interface, in communication with said video outputs, for selectively providing a portion of data from said video data bus to at least two of said video outputs.

25. The hub of claim 24, wherein said data portion provided by said display interface comprises analog data.

26. The hub of claim 25, wherein said display interface is adapted to interface with a CRT display.

27. The hub of claim 24, wherein said data portion provided by said display interface comprises digital data.

28. The hub of claim 27, wherein said data portion provided by said display interface further comprises synchronization, data enable, and clock signals.

29. The hub of claim 28, wherein said controller is adapted for programming said display interface in order to buffer desired data of said video data bus in association with said display interface.

30. The hub of claim 29, wherein said buffering according to said programmed display interface occurs in a display device interconnected to said display interface via said video outputs.

31. The hub of claim 29, wherein said buffering according to said programmed display interface occurs within said display interface.

32. The hub of claim 24, wherein said display interface further comprises a power output connection for providing a display device with a source of power.

33. The hub of claim 8, wherein said second video data source input interface is adapted for selectively providing said portion of said second data signal to said video data bus at plural times, resulting in plural overlay portions in said bus data.

34. The hub of claim 8, further comprising at least one additional second video data source input interface, each for selectively providing at least a portion of a respective second data signal as a respective overlay portion in said bus data.

35. The hub of claim 8, wherein said first video data source input interface is configured by said controller to define which portion of said first data signal is to be provided to said video data bus.

36. The hub of claim 8, wherein said controller further comprises a control bus interface for enabling the programming of said controller by an external controller.

37. The hub of claim 8, wherein said second video data source input interface is adapted to receive video data bus data from another hub as said second data signal.

38. The hub of claim 8, wherein said second video data source input interface is adapted to signal said first video data source input interface when said second video data source input interface is selectively providing said overlay portion to said video data bus.

39. The hub of claim 38, wherein said first video data source input interface is adapted to cease providing said base portion to said video data bus while said second video data source input interface is signaling said selective provision of overlay portion to said video data bus.

40. A method of using a video distribution hub for overlaying a portion of a second data stream into a portion of a first data stream transmitted over a video data bus to generate a third composite data stream, comprising the steps of:

receiving said first data stream as a sequence of data units, said data stream being more data than that which is displayable on a single video display device;

converting said first data stream to a video data bus format;

identifying said portion of said converted first data stream to be transmitted over said video data bus;

transmitting said portion of said converted first data stream over said video data bus;

receiving said second data stream as a sequence of data units;

converting said second data stream to a video data bus format;

identifying said portion of said converted second data stream to be overlaid into said portion of said converted first data stream;

interrupting said transmission of said portion of said converted first data stream over said video data bus; and transmitting said portion of said converted second data stream over said video data bus to generate said third data stream on said video data bus, wherein said third data stream comprises data which is displayable at one time by one video display device.

41. The method of claim 40, further comprising the steps of:

receiving a portion of said third data stream as a fourth data stream; and providing said fourth data stream as an input to a display device.

42. The method of claim 40, wherein either or both of said steps of receiving said first data stream and of receiving said second data stream further comprise receiving a sequence of graphics commands for the generation of digital data comprised of plural data units.

43. The method of claim 40, wherein said steps of identifying said portion of said converted first data stream to be transmitted and identifying said portion of said converted second data stream to be transmitted each further comprises the steps of defining at an external controller which portion of said converted first or second data stream is to be transmitted over said video data bus and conveying said definition to said video distribution hub.

44. The method of claim 40, wherein said steps of identifying said portion of said converted first data stream and of identifying said portion of said converted second data stream each further comprises the step of identifying non-consecutive data units from said respective data stream.

45. The method of claim 40, wherein said step of transmitting said portion of said converted second data stream occurs multiple times for each iteration of said step of transmitting said portion of said converted first data stream.

46. The method of claim 40, wherein said step of receiving said first data stream further comprises classifying said first data stream according to synchronization and timing signals associated therewith and performing said step of identifying said portion of said converted first data stream in accordance therewith.

47. The method of claim 40, wherein said step of receiving said second data stream further comprises classifying said second data stream according to synchronization and timing signals associated therewith and performing said step of identifying said portion of said converted second data stream in accordance therewith.

48. The method of claim 40, wherein said step of interrupting further comprises asserting a notification signal when said portion of said converted second data stream is being transmitted over said video data bus.

49. The method of claim 48, wherein said step of interrupting further comprises recognizing the assertion of said notification signal and ceasing said transmission of said portion of said converted first data stream until said notification signal is de-asserted.

50. The method of claim 40, further comprising the step of selecting an input interface card for performing each of said steps of receiving said first data stream, converting said first data stream, identifying said portion of said converted first data stream, and transmitting said portion of said converted first data stream based upon a data format of said first data stream.

51. The method of claim 40, further comprising the step of selecting an input interface card for performing each of said steps of receiving said second data stream, converting said second data stream, identifying said portion of said converted second data stream, and transmitting said portion of said converted second data stream based upon a data format of said second data stream.

52. A video distribution apparatus, comprising:

a video distribution hub for receiving a video input signal from a first source and a video overlay signal from a second source, and for providing plural video output signals to corresponding output ports, each video output signal representing a selected portion of said video input signal and at least a portion of said video overlay signal, said video distribution hub further comprising plural frame buffer logic elements, each for receiving said video input signal, for selectively capturing said selected portion of said video input signal, and for selectively providing said video output signal to said corresponding output port, said video input signal comprising more data than that which is displayable at one time by at least one video display device attachable to a corresponding output port.

53. The video distribution apparatus of claim 52, further comprising a host for providing said video input signal.

54. The video distribution apparatus of claim 53, wherein said host comprises a video graphics adapter having an interface to said hub, said video input signal being an RGB analog signal.

55. The video distribution apparatus of claim 53, wherein said host further comprises a display buffer for storing video data corresponding to said video input signal.

56. The video distribution apparatus of claim 52, wherein said video input signal is a digital signal.

57. The video distribution apparatus of claim 52, wherein said video input signal is an analog signal, and said video distribution hub further comprises an analog-to-digital circuit element for converting said video input signal to a digital signal.

58. The video distribution apparatus of claim 57, wherein said analog-to-digital circuit element comprises an analog-to-digital converter (ADC) for each color component of said analog signal, each analog-to-digital converter for providing a digital ADC signal.

59. The video distribution apparatus of claim 58, wherein said analog-to-digital circuit element comprises buffers for storing said digital ADC signals.

60. The video distribution apparatus of claim 57, said analog-to-digital circuit element further comprising a control circuit for receiving information descriptive of a video display attachable to a corresponding output port and for generating horizontal and vertical offset data referencing an initial capture point in said video input signal.

61. The video distribution apparatus of claim 60, wherein said descriptive information is received from at least one of a user and said attachable video display.

62. The video distribution apparatus of claim 57, wherein said analog-to-digital circuit element further comprises a sync processor for providing synchronization signals for said video input signal.

63. The video distribution apparatus of claim 57, wherein said analog-to-digital circuit element further comprises a video clock regenerator for providing clocks employable within said video distribution hub.

64. The video distribution apparatus of claim 57, wherein said analog-to-digital circuit element further comprises an on-screen display circuit providing an output which is multiplexable with said digital ADC signals.

65. The video distribution apparatus of claim 52, wherein said video input signal is comprised of plural color components, and wherein each of said frame buffer logic element, comprises a frame buffer data capture circuit for each of said video input signal color components, each of said frame buffer data capture circuits for receiving said a respective video input signal color component and for selectively providing said video input signal color component to said corresponding output port.

66. The video distribution apparatus of claim 65, wherein each of said frame buffer data capture circuits further comprises a data processing element and a data storage element,
said data processing element for receiving and selectively forwarding said video input signal color component to said data storage element for storage, and further for receiving said stored video input signal color component from said data storage element and for providing said stored video input signal color component as a portion of said video output signal to said corresponding output port.

67. The video distribution apparatus of claim 66, wherein each of said frame buffer logic elements further comprises a display interface for receiving and converting said stored video input signal color component to said video output signal having a data format appropriate for a respective video display attached to said corresponding output port.

68. The video distribution apparatus of claim 65, wherein each of said frame buffer logic elements further comprises a frame buffer control circuit for controlling the selective provision of said video input signal color component.

69. The video distribution apparatus of claim 52, wherein at least one of said plural frame buffer logic elements further comprises a digital-to-analog conversion element and said video output signal provided by said least one of said frame buffer logic elements is an analog signal.

70. The video distribution apparatus of claim 52, wherein said video distribution hub further comprises an external communications port enabling external hub configuration control.

71. The video distribution apparatus of claim 52, further comprising a communications channel between a video display attachable to each of said plural output ports and said video distribution hub enabling said hub to auto-configure based upon data received from each of said video displays.

72. The video distribution apparatus of claim 52, wherein at least one of said plural video displays is a flat panel display.

73. The video distribution apparatus of claim 52, wherein said plural video output signals represent non-contiguous portions of said video input signal.

74. The video distribution apparatus of claim 52, wherein said plural video output signals represent contiguous portions of said video input signal.

75. The video distribution apparatus of claim 52, wherein said plural video output signals represent overlapping portions of said video input signal.

76. The video distribution apparatus of claim 52, further comprising at least one second video distribution hub for receiving a respective one of said plural video output signals.

77. A video distribution hub, comprising:
a front end for receiving a video signal and an overlay signal;
plural output ports; and
plural frame buffer elements in communication with said front end and said output ports, each frame buffer element for selectively capturing at least a portion of said received video signal and for providing a signal representative of the respective captured portion and at least a portion of the overlay signal to a corresponding one of said plural output ports, wherein
said video signal comprises more data than that which is displayable at one time by at least one video display device attachable to a corresponding one of said plural output ports.

78. The video distribution hub of claim 77, wherein
said video signal is a digital signal, and
said front end further comprises buffers for receiving said digital video signal prior to communicating said digital video signal to said plural frame buffer elements.

79. The video distribution hub of claim 77, wherein
said video signal is an analog signal, and
said front end further comprises:
an analog-to-digital conversion portion for converting said analog video signal to a digital video signal; and
buffers for buffering said digital video signal prior to communicating said digital video signal to said frame buffer elements.

80. The video distribution hub of claim 77, wherein said front end comprises a sync processor for generating synchronization signals from said video signal.

81. The video distribution hub of claim 77, wherein said front end comprises a control circuit for generating control signals for controlling the selective capturing of the received video signal.

82. The video distribution hub of claim 81, further comprising a data path for providing data from a video display device attachable to one of said output ports to said control circuit.

83. The video distribution hub of claim 81, wherein each of said plural frame buffer elements comprises:
plural data processing elements for selectively capturing a portion of said received video signal; and
a control element responsive to said control signals for controlling said selective capture of said received video signal portions in said plural data processing elements.

84. The video distribution hub of claim 83, wherein each of said plural data processing elements further comprises:
a data manipulation portion; and
a storage element, wherein
said data manipulation portion is adapted for receiving said video signal, for selectively forwarding said portion of said video signal to said data storage element, for receiving a stored portion of said video signal from said storage element, and for reformatting said stored video signal portion and providing said reformatted video signal portion to a corresponding one of said output ports.

85. The video distribution hub of claim 83, wherein said control element further comprises:
a video sequencer responsive to said control signals for reformatting said received video signal and for controlling said selective capture of said received video signal portion;
a memory controller for coordinating temporary storage of said selectively captured video signal portion; and a panel microsequencer responsive to said control signals for reformatting said temporarily stored video signal portion.

86. The video distribution hub of claim 77, further comprising an external interface port for hub configuration control.

87. The video distribution hub of claim 77, wherein each of said plural frame buffer elements further comprises a digital-to-analog converter, enabling said hub to provide an analog, reformatted video signal output to a corresponding one of said output ports.

88. The video distribution hub of claim 87, wherein said analog, reformatted video signal output is provided as an input to a like video distribution hub attachable to said corresponding one of said output ports.

89. A video hub for distributing a digital video signal and an overlay signal, comprising:

plural frame buffer elements, each for selectively capturing portions of said video signal, for reformatting said captured video signal portions, and for providing said reformatted video signal portions merged with at least a portion of said overlay signal to a corresponding output interface in a form compatible with a video display device or devices attachable thereto, wherein said video signal comprises more data than that which is displayable at one time by at least one video display device attachable to a corresponding output interface.

90. The video hub of claim 89, wherein each of said plural frame buffer elements comprises:

plural data processing elements for selectively capturing and reformatting a portion of said received video signal;

a control element for controlling said selective capture and reformatting of said received video signal in said plural data processing elements; and an output interface for receiving said video signal portions from said plural data processing elements and for providing said captured and reformatted video signal portions to said corresponding video display device attachable thereto.

91. The video hub of claim 90, wherein each of said plural data processing elements further comprises:

a data manipulation portion; and a storage element, wherein said data manipulation portion is adapted for receiving said video signal, for selectively forwarding said video signal portions to said data storage element, for receiving a stored portion of said video signal from said storage element, and for reformatting said stored video signal portion and providing said reformatted video signal portion to said output interface.

92. The video hub of claim 90, wherein said control element further comprises:

a video sequencer for formatting said received video signal and for controlling said selective capture of said received video signal;

a memory controller for coordinating temporary storage of said selectively captured video signal portion; and a panel microsequencer for reformatting said temporarily stored video signal portion according to characteristics of said plural video display device attachable to said corresponding output interface.

93. The video hub of claim 89, wherein each of said plural frame buffer elements further comprises a digital-to-analog converter, enabling said hub to output an analog, reformatted video signal portion.

94. A method of distributing a portion of a video input signal with an overlay signal to one of plural video display devices using a video distribution hub, said method comprising the steps of:

receiving said video input signal and the overlay signal at a front end of said hub from external sources, said video input signal comprising more data than is displayable on at least one of said plural video display devices at one time;

forwarding said video input signal and overlay signal as digital signals from said front end to plural frame buffers of said hub;

capturing a portion of said video input digital signal with one of said frame buffers;

reformatting said video input digital signal portion with said frame buffer; and providing said reformatted video input digital signal portion merged with said overlay signal from said frame buffer to a respective one of said plural video display devices.

95. The method of claim 94, wherein said step of receiving further comprises receiving an analog signal as said video input signal at said hub front end, and said step of forwarding further comprises converting said analog signal at an analog-to-digital converter within said hub front end to said digital signal.

96. The method of claim 94, wherein said step of receiving further comprises receiving said video input signal as a digital signal at said hub front end.

97. The method of claim 94, wherein said step of capturing further comprises selectively loading registers within said frame buffer with said digital signal.

98. The method of claim 97, wherein said step of capturing further comprises selectively loading based upon control data received from said hub front end at said frame buffer.

99. The method of claim 94, wherein said step of capturing further comprises selectively storing said digital signal portion in a memory within said frame buffer.

100. The method of claim 94, wherein said step of reformatting further comprises accumulating and frequency shifting said digital signal portion within said frame buffer to accommodate said video display device.

101. The method of claim 94, wherein said step of providing further comprises receiving said reformatted digital signal portion from said frame buffer at an output interface for conversion to a signal format required by said video display device.

* * * * *